United States Patent
Hannig

(10) Patent No.: US 8,381,476 B2
(45) Date of Patent: Feb. 26, 2013

(54) PANEL AND FLOOR COVERING

(75) Inventor: Hans-Juergen Hannig, Bergisch Gladbach (DE)

(73) Assignee: Akzenta Paneele + Profile GmbH, Kaisersesch (DE)

( * ) Notice: Subject to any disclaimer, the term of this patent is extended or adjusted under 35 U.S.C. 154(b) by 549 days.

(21) Appl. No.: 12/517,876

(22) PCT Filed: Dec. 4, 2007

(86) PCT No.: PCT/EP2007/063241
§ 371 (c)(1),
(2), (4) Date: Nov. 2, 2009

(87) PCT Pub. No.: WO2008/068245
PCT Pub. Date: Jun. 12, 2008

(65) Prior Publication Data
US 2010/0043333 A1    Feb. 25, 2010

(30) Foreign Application Priority Data
Dec. 6, 2006  (DE) .......................... 10 2006 057 491

(51) Int. Cl.
*E04B 2/00*    (2006.01)
(52) U.S. Cl. ............ 52/582.1; 52/391; 52/588.1; 428/50
(58) Field of Classification Search ................. 52/582.1, 52/582.2, 584.1, 587.1, 586.1, 586.2, 585.1, 52/390, 392, 533, 534, 539, 553, 578, 581.1, 52/589.1, 590.2, 590.3, 591.1, 591.2, 591.4, 52/591.5, 592.1, 582.4, 745.08, 745.19, 747.1, 52/747.11, 748.1, 748.11; 403/334, 345, 403/364–368, 372, 375, 376, 381; 428/44, 47–50, 57, 58, 60, 61, 106, 192–194
See application file for complete search history.

(56) References Cited

U.S. PATENT DOCUMENTS

| | | | | |
|---|---|---|---|---|
| 6,647,690 | B1* | 11/2003 | Martensson | 52/601 |
| 6,854,235 | B2* | 2/2005 | Martensson | 52/601 |
| 7,454,875 | B2* | 11/2008 | Pervan et al. | 52/586.2 |
| 2007/0006543 | A1* | 1/2007 | Engstrom | 52/582.1 |

FOREIGN PATENT DOCUMENTS

| | | |
|---|---|---|
| WO | 01/98604 A | 12/2001 |
| WO | 03/016654 A | 2/2003 |
| WO | 2006/043893 X | 4/2006 |
| WO | 2006/104436 A | 10/2006 |
| WO | 2007/015669 | 2/2007 |
| WO | 2007/079845 | 7/2007 |

* cited by examiner

*Primary Examiner* — William Gilbert
(74) *Attorney, Agent, or Firm* — Lucas & Mercanti, LLP

(57) ABSTRACT

A panel with a working surface and four edges of which oppositely disposed pairs of edges have corresponding holding profiles so similar panels are connectable. Holding profiles of a first pair of edges are connectable by angular movement into interlocking relationship Holding profiles of a second pair of edges are hook elements, which are connectable to similar adjacent panels by joining movement provided a hook element is a separate vertical locking element projecting toward joining movement of the hook elements. During joining, the vertical locking element is movable out of the path of joining movement and when hooked, the hook elements are movable toward the joining movement by spring action. When dismantling, connected panels are unlockable from hooked and vertically locked condition by pivoting about an axis near the hooked edges and toward an unlocking position. The working surfaces, when unlocked, are less than 180° relative to each other.

15 Claims, 19 Drawing Sheets

PANEL AND FLOOR COVERING

This application is a 371 of PCT/EP2007/063241 filed Dec. 4, 2007, which in turn claims the priority of DE 10 2006 057 491.5 filed Dec. 5, 2006, the priority of both applications is hereby claimed and both applications are incorporated by reference herein.

The invention concerns a panel having a working surface and four edges of which oppositely disposed pairs of edges have corresponding holding profiles so that similar panels can be connected at all four edges, wherein the holding profiles of a first pair of edges can be connected by angular movement into interlocking relationship and wherein the holding profiles of a second pair of edges are in the form of complementary hook elements so that a similar adjacent panel can be connected at each of the hook elements substantially by means of a joining movement which occurs in a plane of movement perpendicularly to the plane of the panel, with the proviso that provided at least at one of the hook elements of the second pair of edges is a separate vertical locking element which at least partially projects into the path of joining movement of the hook elements, wherein during the joining movement of the hook elements of two panels the vertical locking element is automatically movable out of the path of joining movement to clear same and in the hooked condition of the hook elements is movable automatically into the path of joining movement again by a spring action.

In addition the invention concerns a floor covering composed of a multiplicity of panels according to the invention.

Known panels of the specified general kind are known from WO 03/016654 A1 (Akzenta) and from WO 2006/043893 A1 (Välinge). The man skilled in the art finds in both publications panels which are laid for example in rows, wherein panels are connected together within a row at butting locations. Desirably the known panels are laid in such a way that the butting locations of a row of panels are arranged at a spacing relative to the butting locations of the panels of an adjacent row. In a fresh row a panel is connected to panels of the previous row by so-called angular movement into interlocking relationship. The term angular movement into interlocking relationship denotes a kind of join in which a fresh panel is attached with an edge to the panel of the previous row, wherein the fresh panel is attached in an inclined plane relative to the plane of the previous row of panels. Locking of the fresh panel is effected by an angular movement during which the fresh panel is pivoted down into the plane of the panels of the previous row.

If a panel is already present in the row in which the fresh panel is being laid, the fresh panel is also simultaneously connected during the above-described angular movement into interlocking relationship, at panels in a preceding row, to the panel in the same row. For that purpose, for connecting the panels within a row, the mutually associated holding profiles of the edges are in the form of hook elements which can be moved towards each other in a direction perpendicularly to the plane of the panels and in that way can be hooked together. The movement in the above-mentioned perpendicular plane is a scissor-like movement. It can also be referred to as a folding movement.

At least at one hook element the known panels have an automatically latching vertical locking element which makes it difficult to separate the panels for dismantling purposes because the vertical locking element cannot be moved out of a locking position at all or can be moved out of such a position only with a special tool. In accordance with WO 03/016654 A1 it is provided that the vertical locking element is removed laterally from the connected condition in order then to be able to move the hooked panels apart again in a direction perpendicularly to the panels. Instead of removal of the vertical locking element WO 2006/043893 teaches using a special tool with which the vertical locking element must be moved out of its locking position so that it is then possible to move the panels apart perpendicularly to the plane of the panels. The special tool is a kind of needle which is laterally inserted into a gap in which the vertical locking element is disposed. In that respect it is absolutely necessary for the needle-thin special tool whose top side and underside differ from each other to be correctly moved around in the gap in which the vertical locking element is disposed. A third unlocking method involves moving connected hook elements away from each other in the plane of the panels, namely parallel to the hooked edges. The latter method however is disadvantageous for those panels, between the hook elements of which there is a high level of static friction and which for that reason can be displaced only with the application of a high force.

The object of the invention is to provide panels which can be easily assembled and also to simplify the dismantling of a floor covering assembled from panels of the general kind set forth.

According to the invention that object is attained in that the complementary hook elements are of such a configuration that the panels, when two panels are connected, are unlockable out of their hooked and vertically locked condition, that at least one panel is pivotable about an axis extending in the region of the hooked edges in a direction in which an unlocking position can be reached, and that the working surfaces of the panels in the unlocking position assume an angle relative to each other which is less than 180°.

With the panel according to the invention there is no need to remove the vertical locking element out of the connection, nor is it necessary to use a special tool to make the locking function of the vertical locking element ineffective, for the purposes of dismantling a floor covering. According to the invention the hook elements are of such a configuration that panels of a row of panels can be separated when they are no longer connected to panels of an adjacent row. If the panels of a row of panels are to be separated from each other, that row of panels firstly has to be released from the connection to their adjacent rows of panels. Then the panels of the same row can be dismantled from each other by a panel which is only still connected at an end within the row being pivoted upwardly at that end and the previous panel from which it is to be separated not being moved.

In principle that movement of unlocking panels in the same row corresponds to a reversal of that movement which has been described hereinbefore as being an angular movement into locking relationship, and with which (angular movement into interlocking relationship) a fresh panel is fitted to panels in a previous row.

As the connection of a fresh panel to panels in a previous row takes place at the same time as the connection of the fresh panel to a panel present in the same row, those connecting operations can influence each other. Thus it may be advantageous for example if, with the scissor-like movement (folding movement) of the fresh panel, adjustment of the position of the hookable edges relative to each other takes place. That then requires a sliding movement within the edges, which are angled into each other, of the first pair of edges of the panels involved, in order to move the hookable edges of the second pair of edges into the desired position during the folding movement. The hook elements can be of such a configuration that automatic positioning of their edges can be afforded by the shape of the hook elements. Automatic positioning is then initiated by the folding movement of the fresh panel.

The panel according to the invention can be for example in the form of a flooring board, a parquet panel or a laminate panel and consequently can either comprise solid wood or can have a core material. The core material can be a wood material comprising grown pieces of wood such as for example a blackboard comprising slat-shaped wood pieces, a multiplex board consisting of wood layers, or a plywood. On the other hand the core material can also be in the form of fibre material. That means wood which has firstly been broken up into fibre pieces and which has then been processed by the addition of binding agent to form wood fibre material such as MDF, HDF, plywood or OSB board. It will be appreciated that other materials are also suitable for a panel according to the invention, for example solid plastic material or at least plastic material as the core material.

If the panel has a core material it is coated and generally has a working surface having decorative properties.

The invention is particularly useful if the panel comprises naturally grown fibre-free wood material such as solid wood or a core material comprising a fibre-free wood material. Holding profiles and in particular hook elements of grown solid wood or fibre-free wood material have a high level of adhesion to each other in the locked condition because of their surface nature and can be pushed apart only with difficulty. The consequence of this is that the above-mentioned third method of unlocking which is known from the state of the art is inappropriate for such panels. The unlocking action in accordance with the invention is thus particularly practical for panels of solid wood or panels with a core material which is a wood material that is fibre-free in accordance with the invention.

Desirably the holding profiles of the first pair of edges at an edge have a groove profile of undercut configuration and at the opposite edge a complementary tongue profile, which can be connected together by angular movement into interlocking relationship. The state of the art discloses a plurality of such undercut groove and tongue profiles which can be connected by angular movement into locking relationship and which are accordingly suitable for the panel according to the invention. The known holding profile geometries can therefore be provided on the first pair of edges and combined with the hook element according to the invention on the second pair of edges.

For the sake of completeness it is to be mentioned that the hook elements of two panels can always be connected even when two panels to be connected lie in a common plane. For that purpose the hook element of a panel is laid in aligned relationship behind the hook element of an adjacent panel so that the cross-sections of the hook elements lie in exactly aligned relationship one behind the other. Then the edges provided with the hook elements are pushed into each other until they overlap on the desired length of the panels. For that laying method attention is directed to FIG. 44 of DE 10 2006 011 887 which shows that in an example. In that example the edge 32 of a panel 30b is assembled in aligned relationship in the direction of the arrow, to an edge of a panel 30a. Under some circumstances at the beginning of the aligning movement it is necessary for the elastic vertical locking element which projects from the edge to be pressed against a little and appropriately presented in such a way that it fits into the adjacent panel.

An alternative configuration of the panel provides that in place of the above-described modified groove and tongue profiles the holding profiles of the first pair of edges are in the form of complementary hook elements a separate vertical locking element is provided at least at one of the hook elements of the first pair of edges, the vertical locking element projects in the manner of a flexible spring from the edge of the panel, the complementary hook element has a groove in the form of a latching recess, and at least a part of the projecting flexible spring of the vertical locking element can be angularly moved into interlocking relationship into the groove in the complementary hook element. As the movement for dismantling panels in the same row, as described above, is a reversal of the movement of angular engagement into interlocking relationship, each panel according to the invention and each of the vertical locking elements can be used to provide a corresponding design configuration for the holding profiles of the first pair of edges and to use them for angular movement of the panel into interlocking relationship at panels of a previous row. The region of the vertical locking element which is crucial for making the connection and which projects from the panel edge is to be interpreted in the broadest sense as a flexible spring in this context. That part of the vertical locking element can involve a cross-section which is close to that of a conventional spring or can also differ greatly therefrom. What is crucial for the vertical locking element with its flexible spring is the locking function thereof in a direction perpendicularly to the plane of the panel and its suitability for angular movement of panels into interlocking relationship.

It is desirable if at least one of the pairs of edges is provided with corresponding hook elements of which each hook element has at least one undercut surface, the undercut surfaces of the two hook elements are so arranged that in the hooked condition of two panels they are arranged on a common unlocking curve and are in contact, and the undercut surfaces are movable away from each other and towards each other on the common unlocking curve.

The arrangement of the undercut surfaces on an unlocking curve promotes dismantling of the panels because no loading or at most a slight loading occurs due to deformation of the holding profiles of the panels.

Handling of the panels can be improved if a hook element for the purposes of connection to the complementary hook element of an adjacent panel can be positioned on a substrate, wherein joining of the hook elements of two panels can be implemented by the panel which can be positioned on the substrate being at rest and by a joining movement being implementable with the adjacent panel, wherein the vertical locking element is preferably provided on that hook element which is at the edge of the panel at rest.

It has been found that the hook elements can be hooked with a greater degree of feel for the user if the vertical locking element is arranged on the lower panel at rest. That also has the advantage that, when the vertical locking element is arranged on the lower panel, it is better visible for the user. It helps therefore if the movement of the vertical locking element, which is initiated by the hook element joining movement caused by the user, can also be recognised by the user.

For easy handling of the panel the vertical locking element can be resiliently movable. The resiliently mobility can be afforded by resilient properties of the vertical locking element itself or by virtue of a separate spring element co-operating with the vertical locking element.

At least for the resilient mobility of a vertical locking element, there can be provided a plane of movement parallel to the plane of the panel.

A vertical locking element which is arranged in a plane of movement parallel to the plane of the panel generally does not have constant spring properties over its entire length. The vertical locking element arranged parallel to the plane of the panel however usually has good strength properties in relation to a vertical loading of a connection provided therewith.

That is because the vertical locking element can be provided with a relatively large cross-section.

Alternatively it can be provided that at least for the resilient mobility of a vertical locking element, there is provided a plane of movement which is both perpendicular to the plane of the panel and also perpendicular to the edge provided with the vertical locking element.

In that case, because it is to be disposed in a plane perpendicular to the panel, the resiliently movable part of the vertical locking element must be of a relatively small cross-section. The height of the vertical locking element will generally not exceed half the panel thickness. Vertical locking elements are usual nowadays, which with the smallest kind of panel, are approximately of a height corresponding to the vertical locking element, that corresponds to a third of the panel thickness.

A panel is found to be particularly advantageous if there is provided a core material of HDF (high density fibreboard) or MDF (medium density fibreboard). Those core materials are produced from broken-up pieces of wood with the addition of a binder. They can be very well subjected to cutting machining and have sufficient strength properties to apply holding profiles according to the invention and to add separate vertical locking elements. As already mentioned hereinbefore however the panel can also comprise other materials.

In the connected condition of two panels at least one dust chamber can be provided within the connection of the holding profiles. That ensures that any dirt particles which can pass into the connection between the holding profiles during the operation of laying a floor covering cannot adversely affect the optimum fit of the connected holding profiles.

The holding profiles can be partially bent in the connected condition of two panels, wherein a clamping force can be produced by the bend which acts in a plane parallel to the plane of the panel. Depending on the respectively desired position of the panels relative to each other the clamping force can be such that the panels are forced relative to each other or are held at a desired distance.

Alternatively or in addition the holding profiles can be partially bent in the connected condition of two panels so that a clamping force can be produced by the bend which acts in a plane perpendicular parallel to the plane of the panel. In that way connected panels can be so positioned relative to each other in respect of height that contact surfaces present within the holding profiles are forced against each other or can be held at the desired distance.

Desirably a clamping force can be produced with the vertical locking element in the connected condition of two panels, wherein the clamping force acts in a plane arranged parallel to the plane of the panel. Depending on the respective requirement involved, the clamping force of the vertical locking element can cause the panels to be forced against each other or can provide for setting a desired distance between the panels.

Alternatively or in addition a clamping force can be produced with the vertical locking element in the connected condition of two panels, wherein the clamping force acts in a plane arranged both perpendicular to the plane of the panel and also perpendicular to the edge provided with the vertical locking element. In that way, depending on the respective direction of the clamping force of the vertical locking element, the panels can be acted upon as required either with a force component which forces a panel upwardly or downwardly relative to the connected panel, perpendicularly to the plane of the panels.

In a simple configuration the holding profiles of the panels are formed integrally on the core material. That can be effected for example by a cutting machining operation.

There is proposed a floor covering having a plurality of compatible panels of the above-described kind, which are connected together.

A particular configuration of the floor covering provides that the individual panels can be unlocked with a low level of wear for the purposes of dismantling of the floor covering and that unlocked panels can be connected again to provide a floor covering. The panel provided for that purpose is one of the above-described configurations of a panel, wherein it is unlockable with a low level of wear.

In principle the vertical locking element can be connected to the corresponding hook element by way of a light press fit or by way of an adhesive connection. A combination of a pressed connection and an adhesive connection is also possible. In that respect it is sufficient if that pressed connection secures the vertical locking element to the hook element in such a way that it cannot be lost. Under some circumstances a press fit is undesirable because that causes forces which lead to unwanted deformation to be applied to the core material of the panel. That is disadvantageous in particular when that deformation is visible on the finished floor covering because for example there is a change in shape at the working surface of the panel. It will be appreciated that an adhesive connection is considered only in relation to those vertical locking elements whose vertical locking element has a fixing region which does not have to move with the region engaged in the hook element; when therefore there is a resiliently movable region which is not touched by the core material of the panel and can freely move.

The publications WO 2006/043893 A1 and WO 2006/104436 A1 disclose resilient, automatically acting locking elements. Those locking elements which exclusively prevent the panels from moving away from each other perpendicularly to the plane of the panels—vertical locking elements—can basically be used for the present invention. The aforementioned vertical locking elements are hereby incorporated into the present description and as a vertical locking element in accordance with the independent claims, by reference to the publications WO 2006/043893 A1 and WO 2006/104436 A1.

A number of embodiments by way of example of the invention are described in detail hereinafter with reference to a plurality of drawings showing portions thereof, in which:

FIG. 1 shows two rows of panels, wherein a new panel is being introduced by angular movement into interlocking relationship, FIGS. 2a to 2e show embodiments for holding profiles which can be angularly moved into interlocking relationship, of a first pair of edges of the panel, Pairs of FIGS. 3a, 3b to 12a, 12b show ten embodiments for corresponding hook elements which on the one hand can be connected by a joining movement in a plane of movement arranged substantially perpendicularly to the panel plane and which on the other hand are unlockable by a pivotal movement about the hooked edges; in these Figures:

FIGS. 3c shows an enlarged view of section IIIc of FIG. 3a,

Figure 3A:
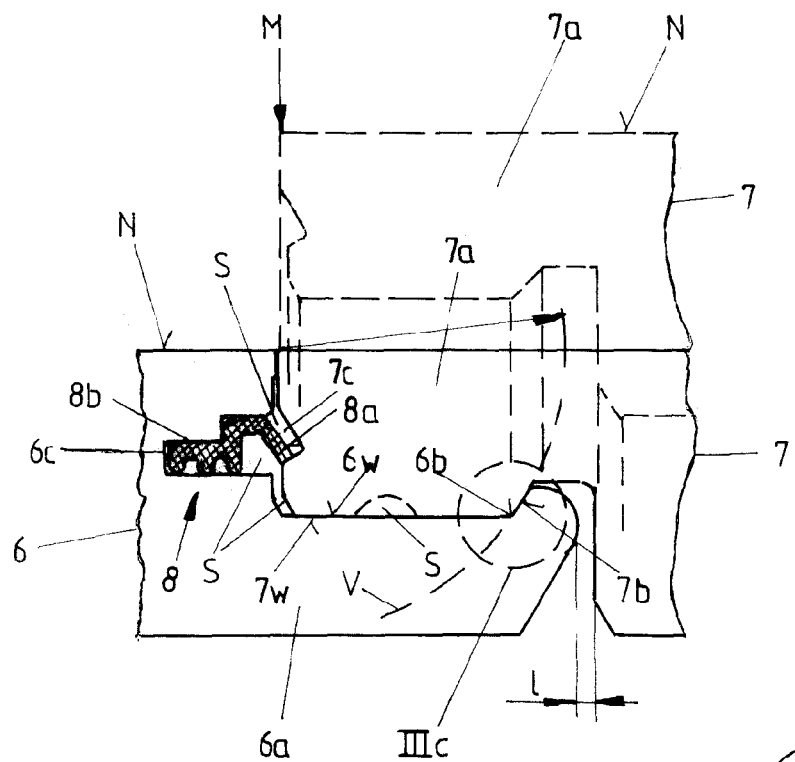
FIGS. 3a and 3b show a vertical locking element on the lower hook element.
Figure 3C:
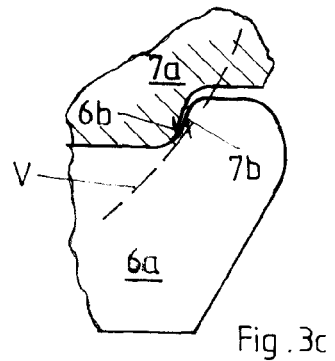
Figure 3B:
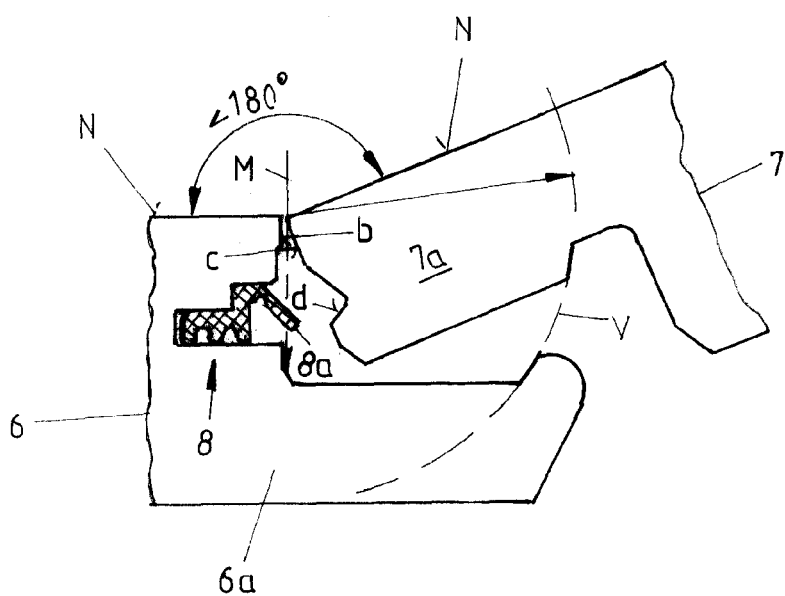
Figure 4A:
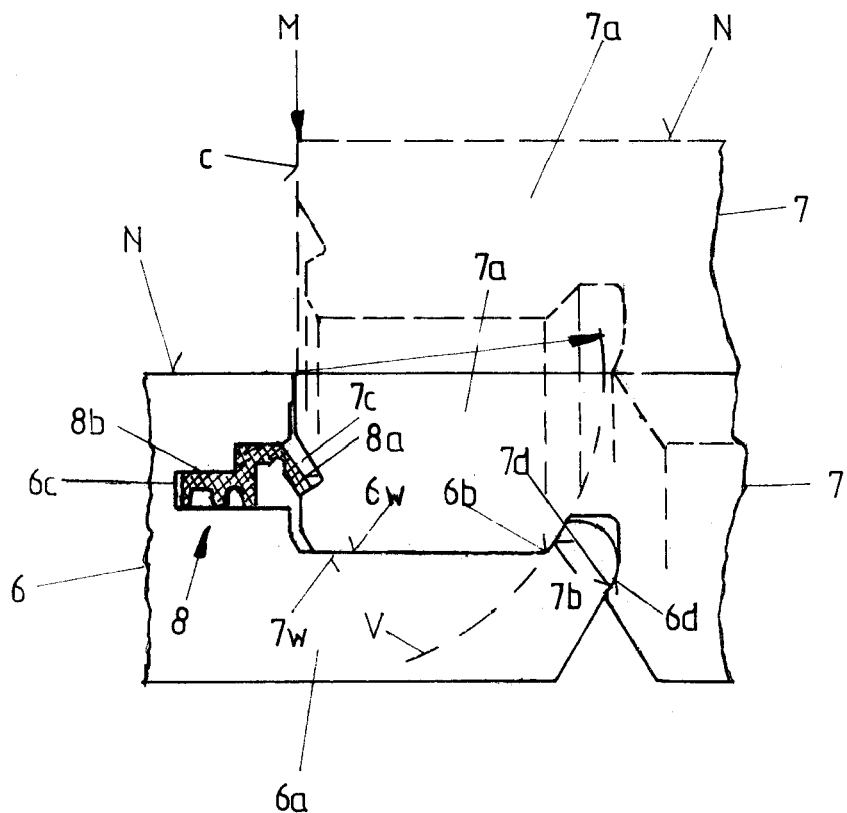
Figure 4B:
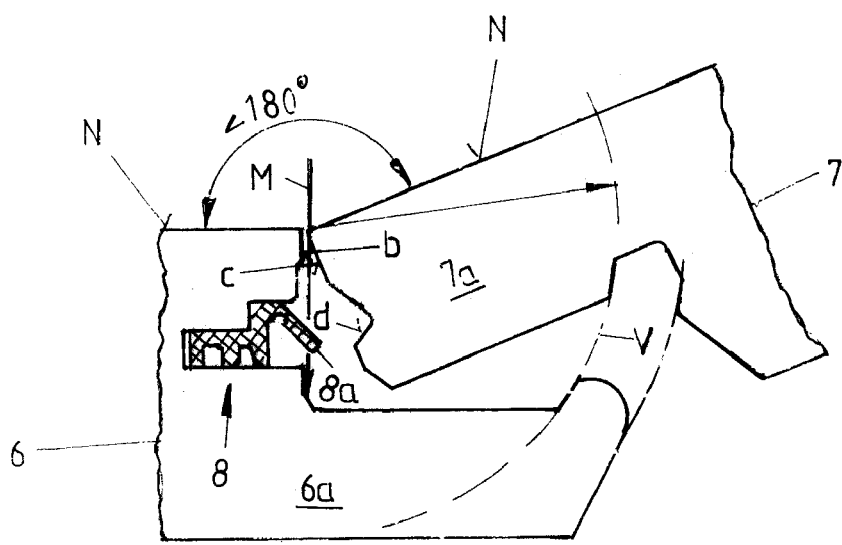
Figure 5A:
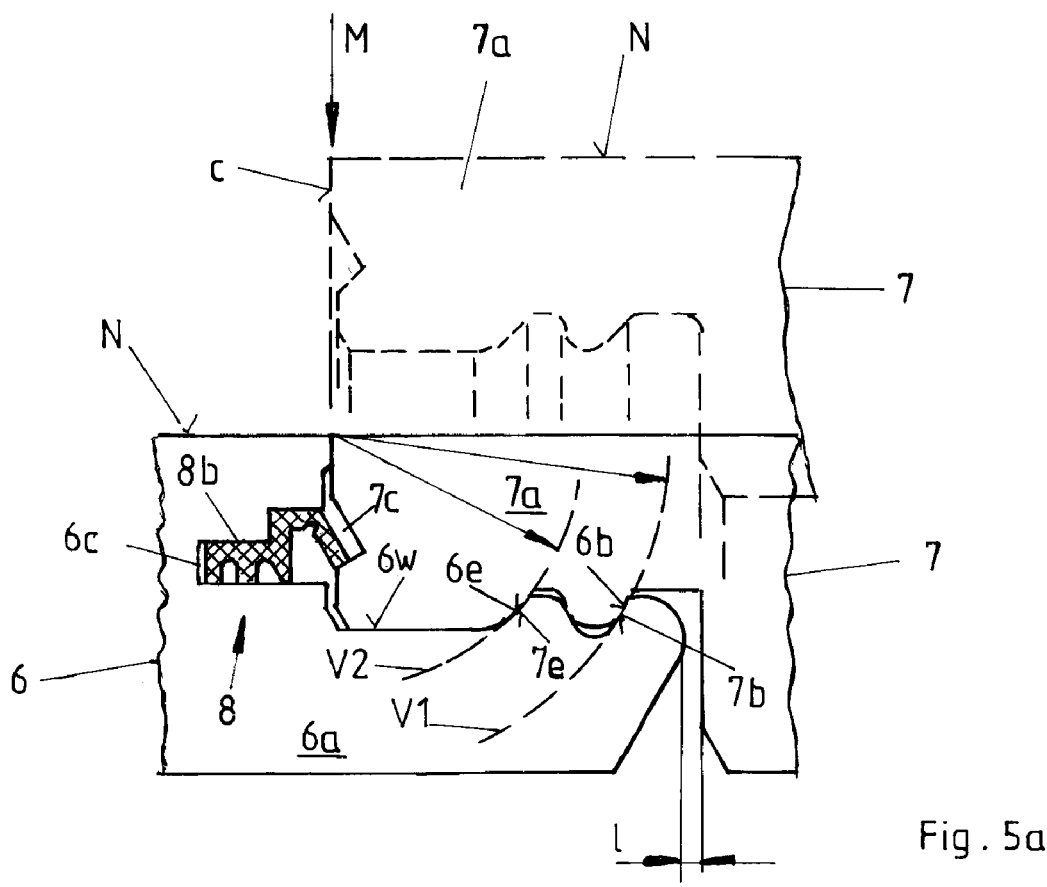
Figure 5B:
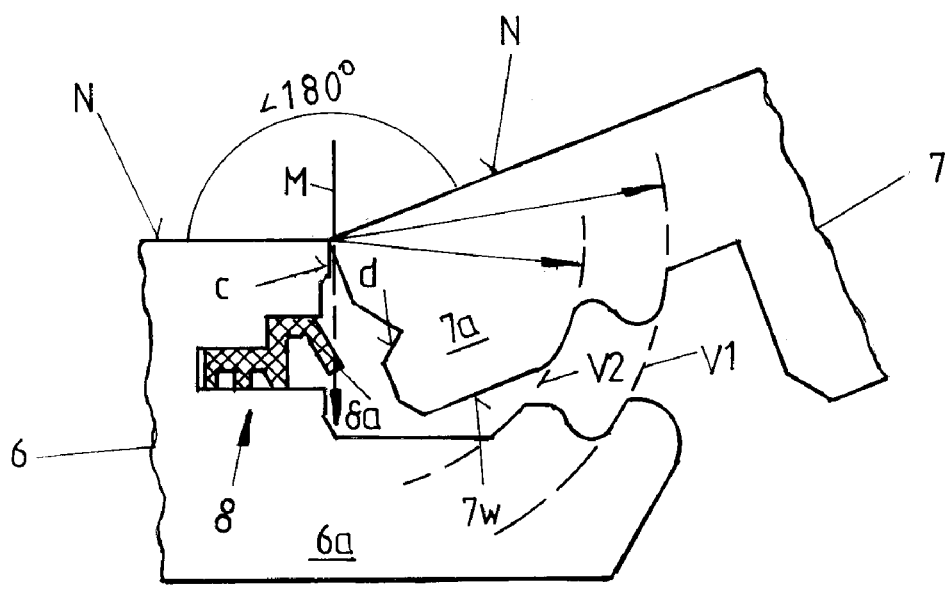
Figure 6A:
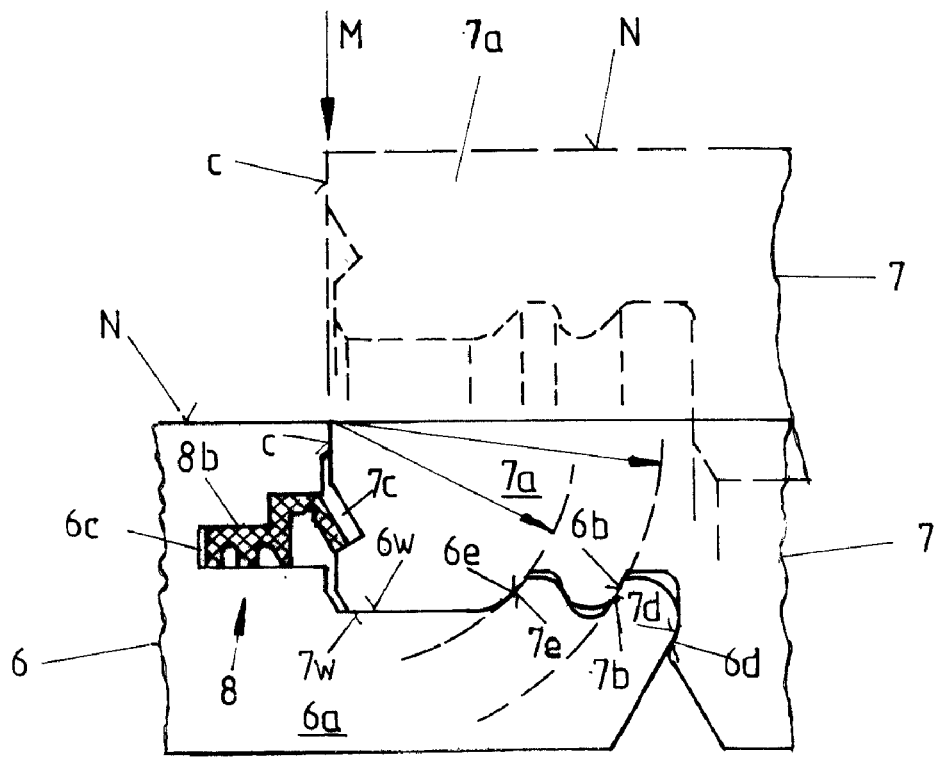
Figure 6B:
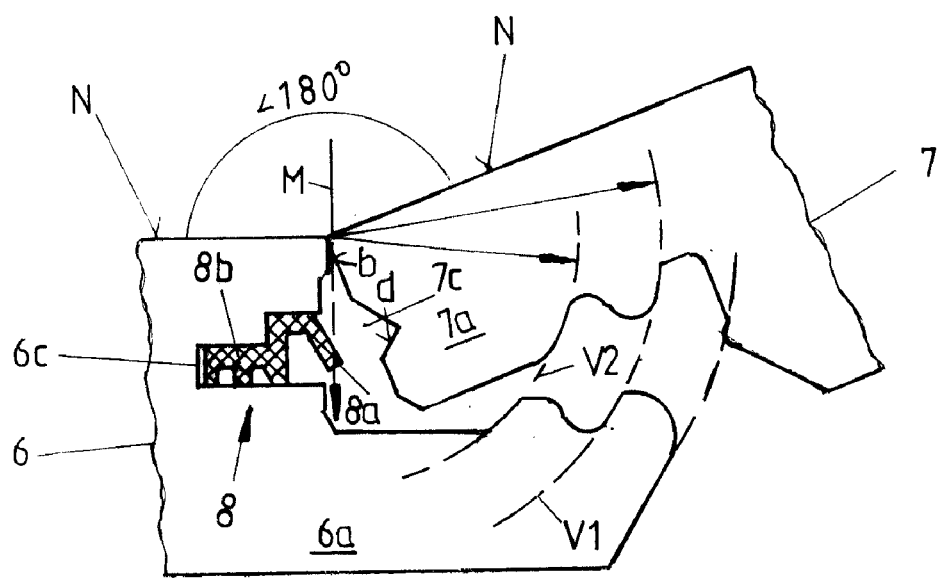
Figure 7A:
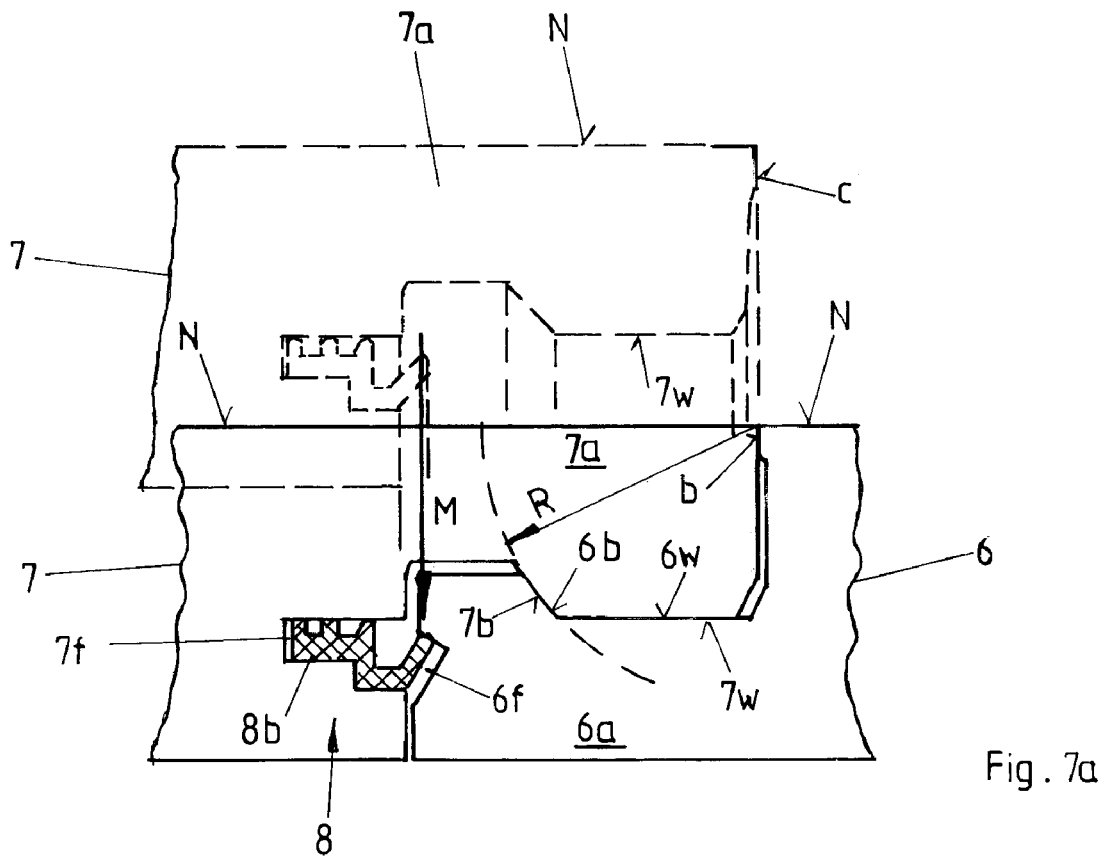
Figure 7B:
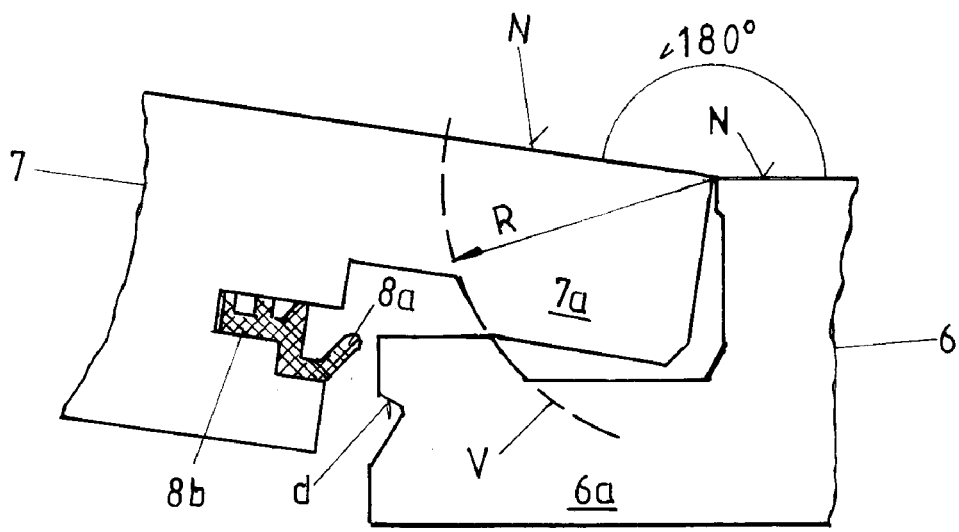
Figure 8A:
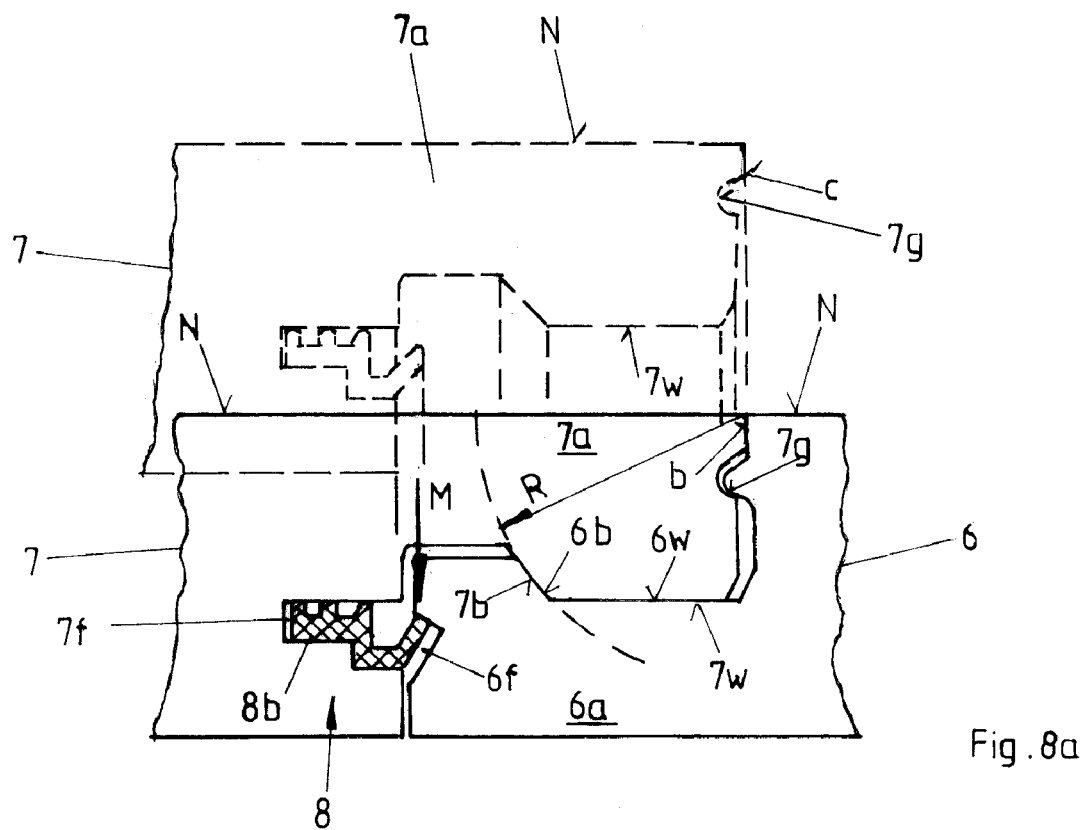
Figure 8B:
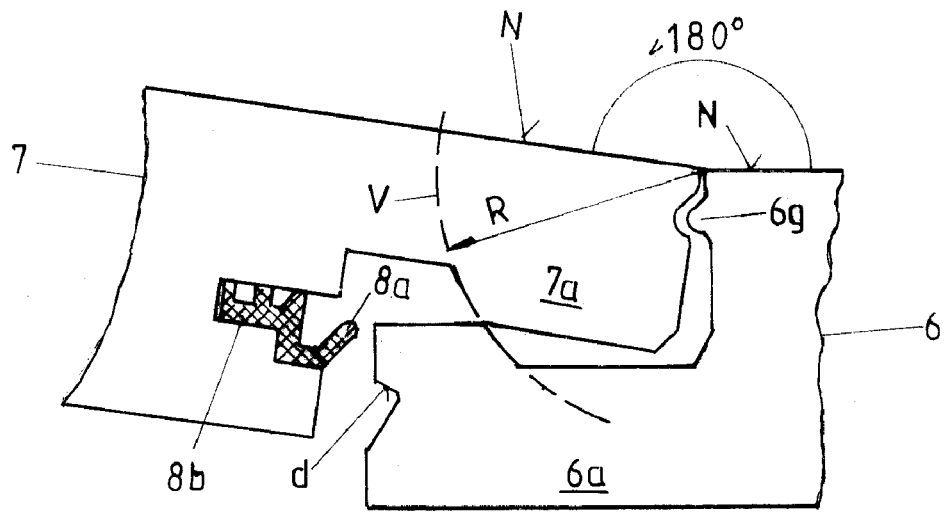
Figure 9A:
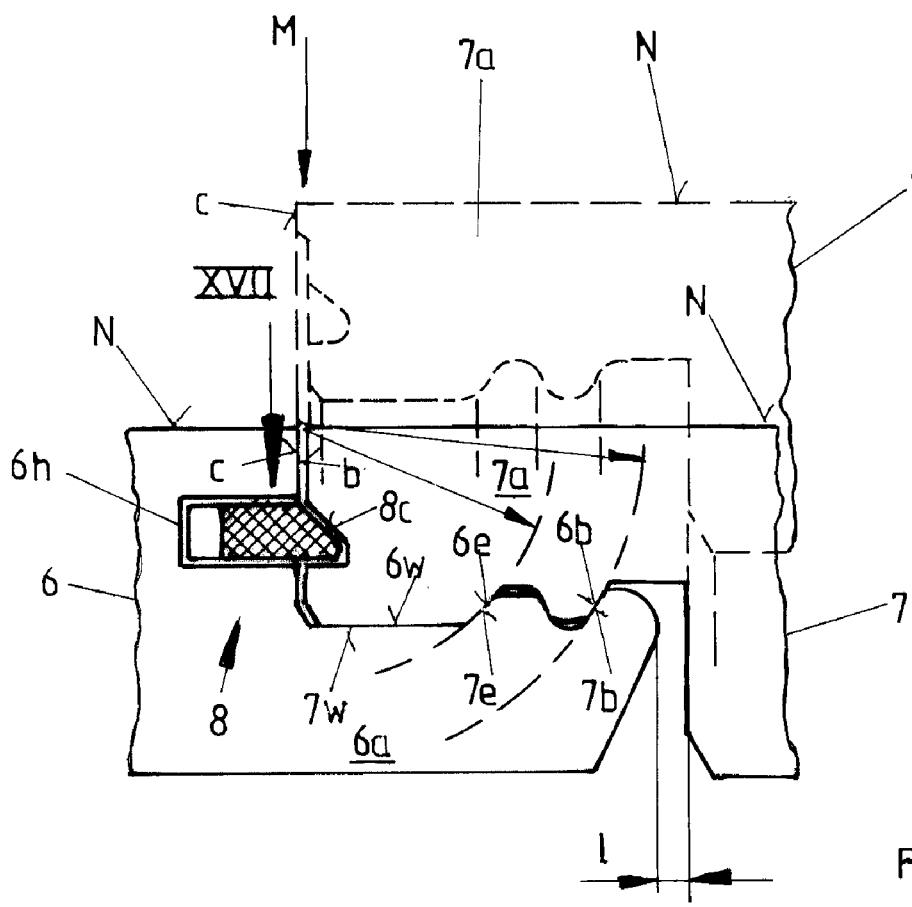
Figure 9B:
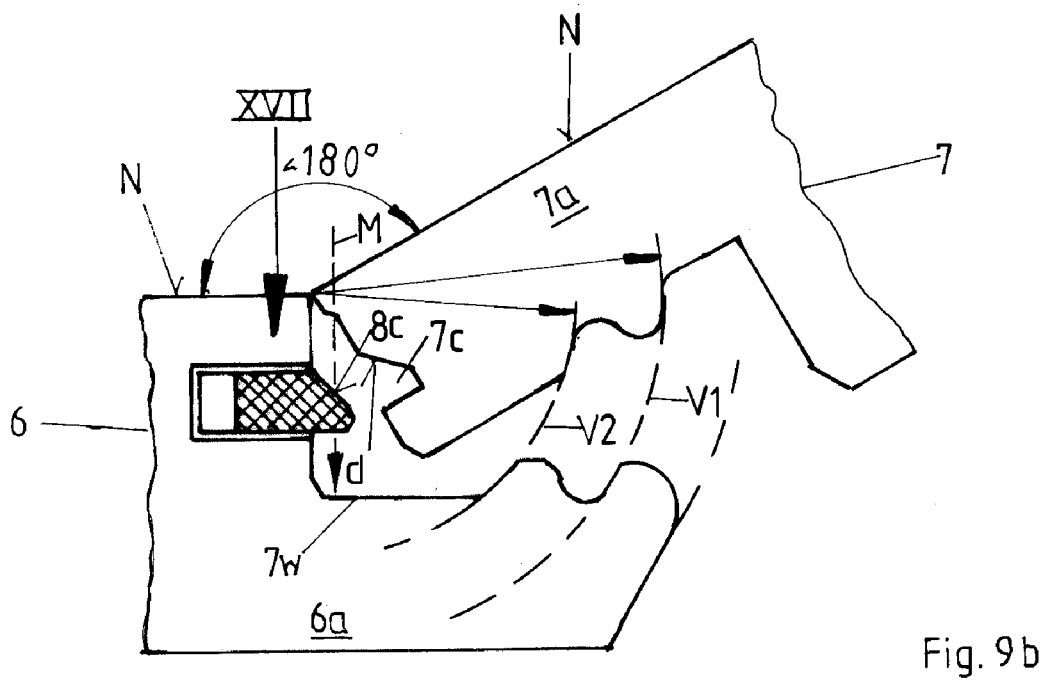
Figure 10A:
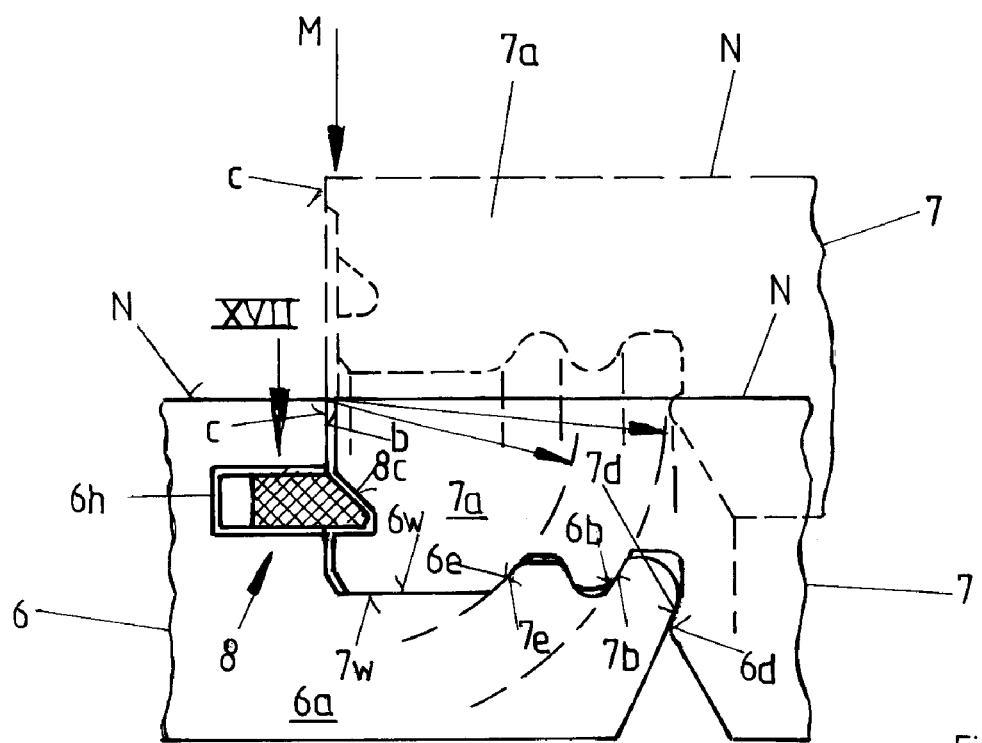
Figure 10B:
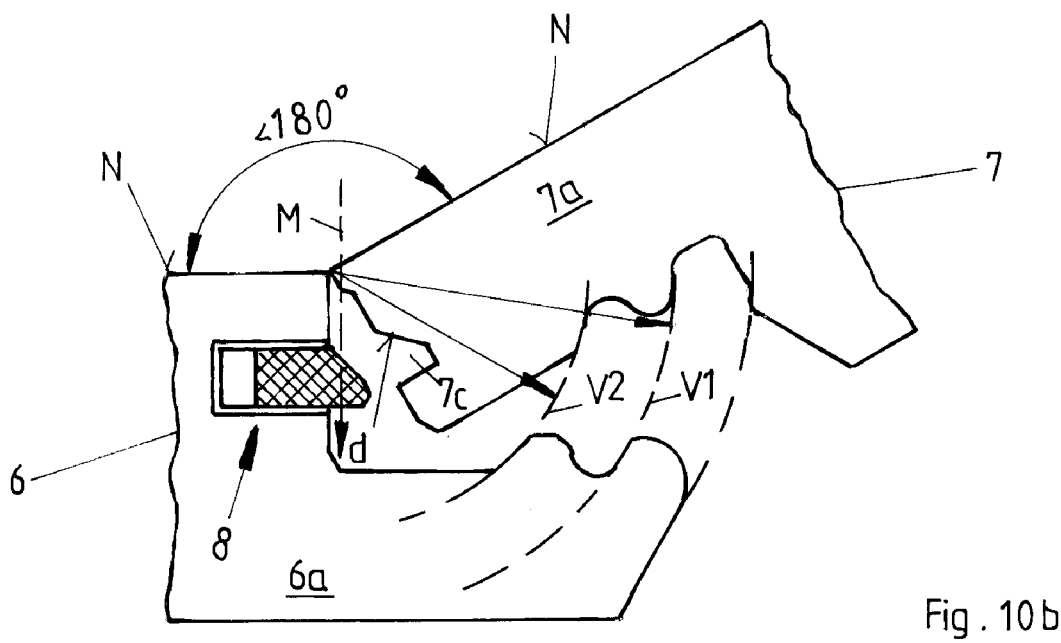
Figure 11A:
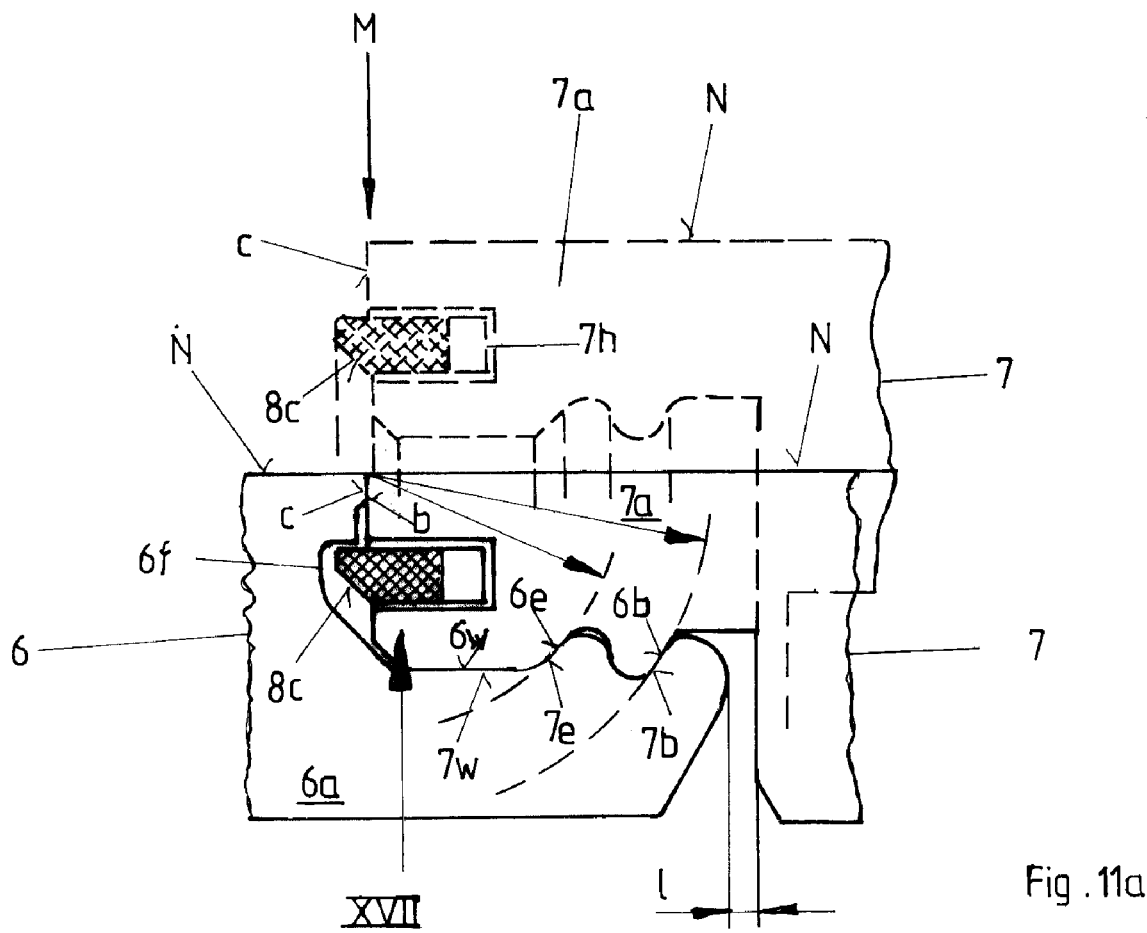
Figure 11B:
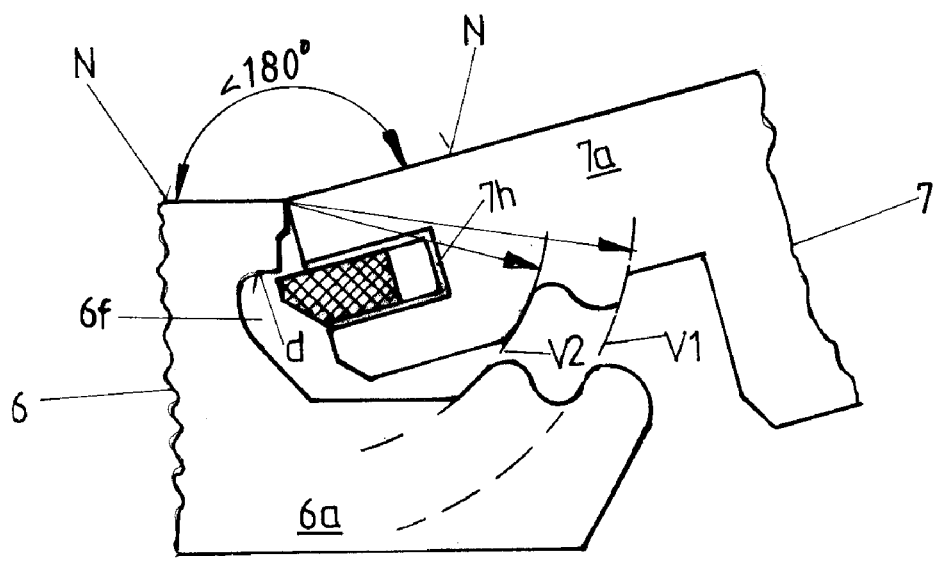
Figure 12A:
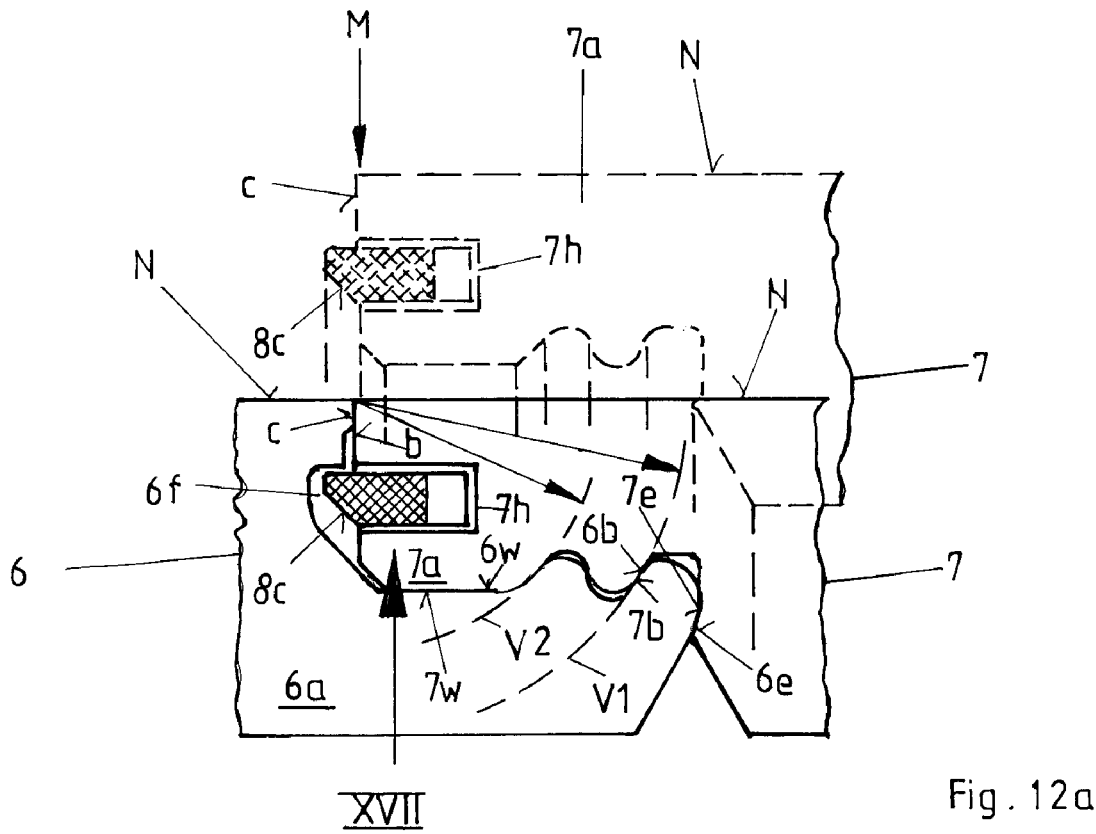
Figure 12B:
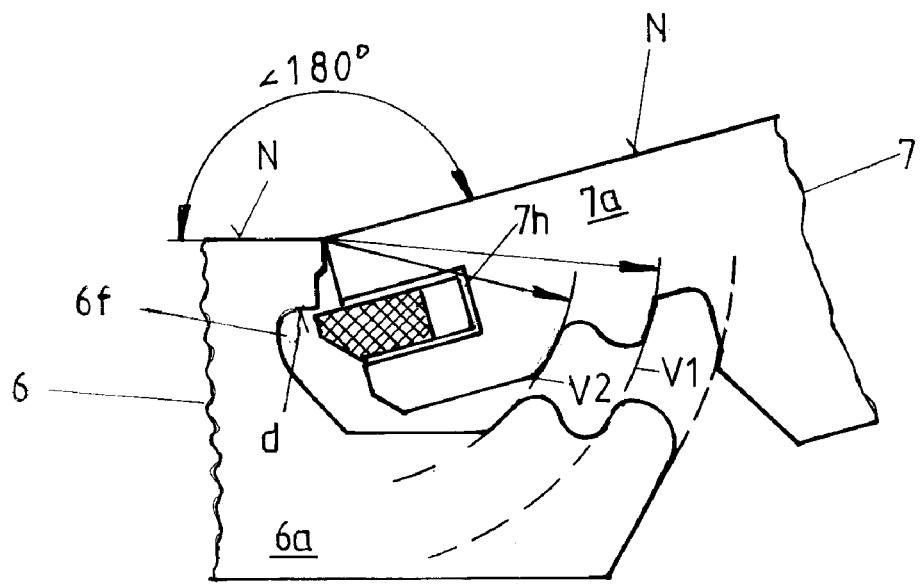
Figure 13A:
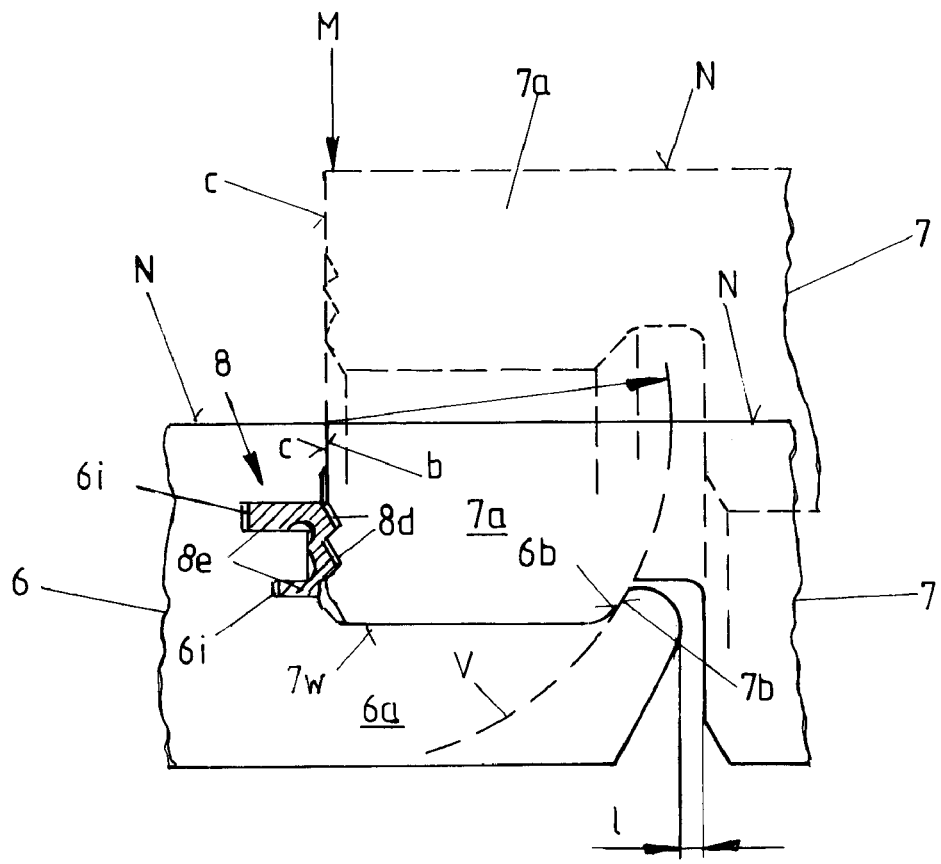
Figure 13B:
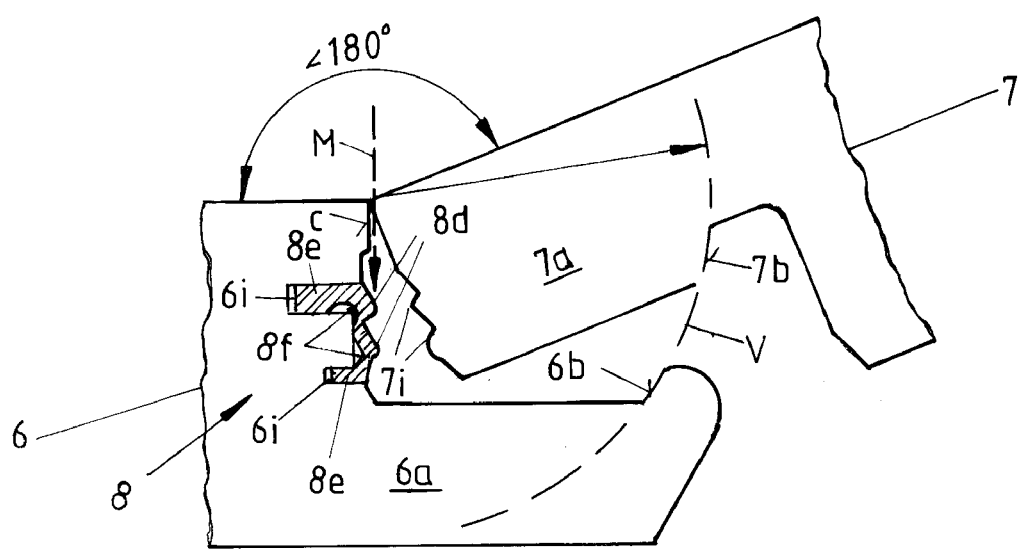
Figure 14A:
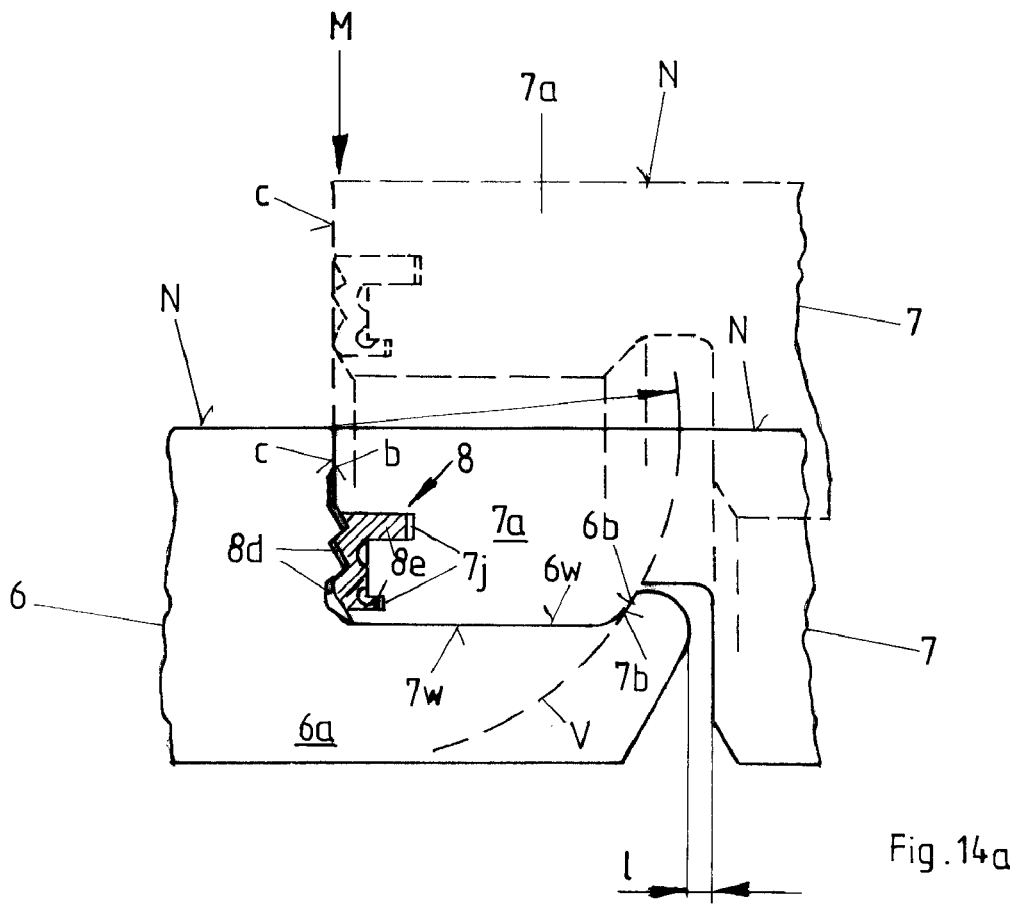
Figure 14B:
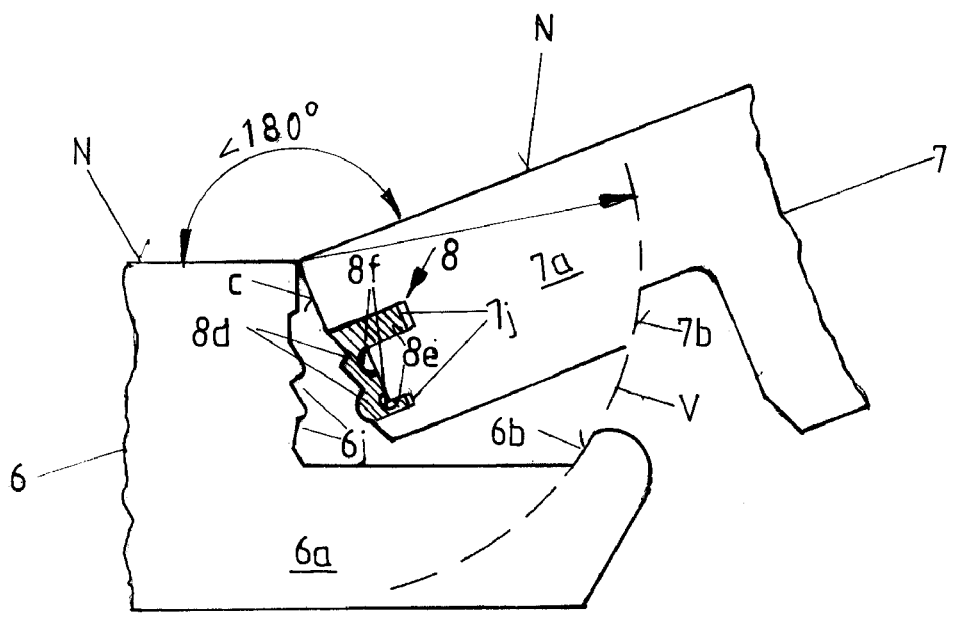
Figure 15A:
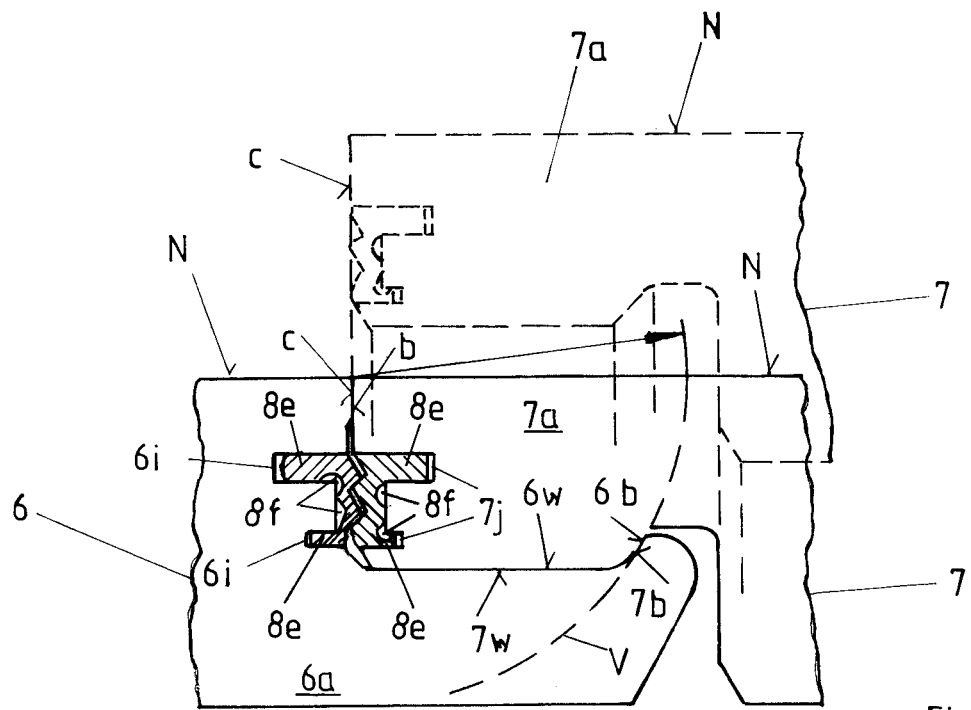
Figure 15B:
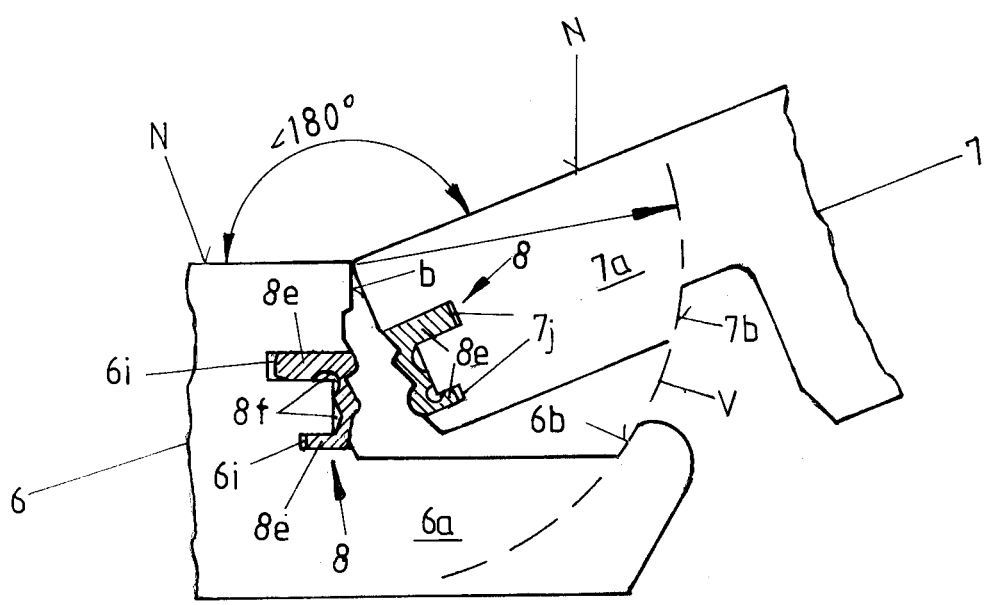
Figure 16:
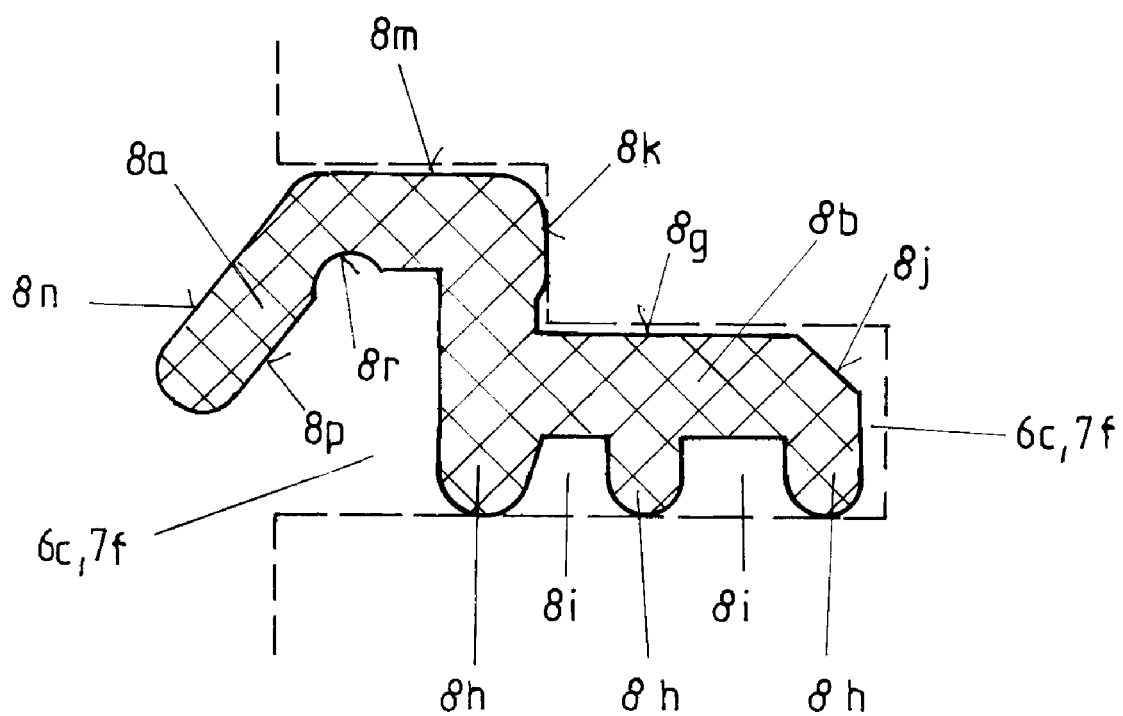
Figure 17:
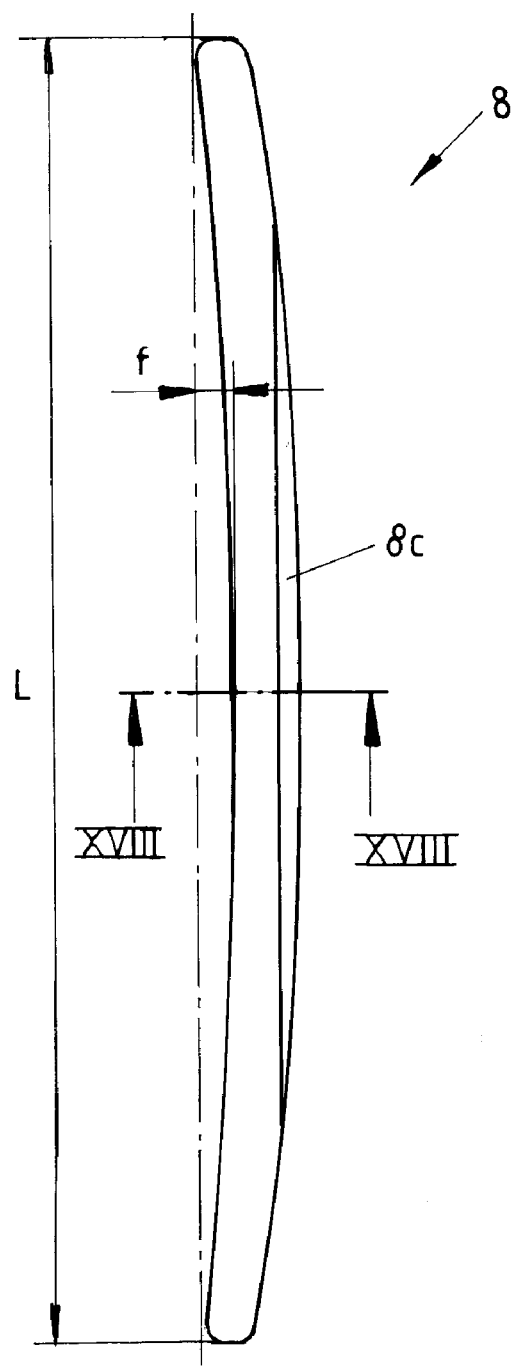
Figure 18:
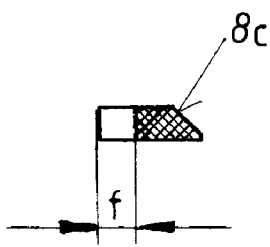
Figure 19:
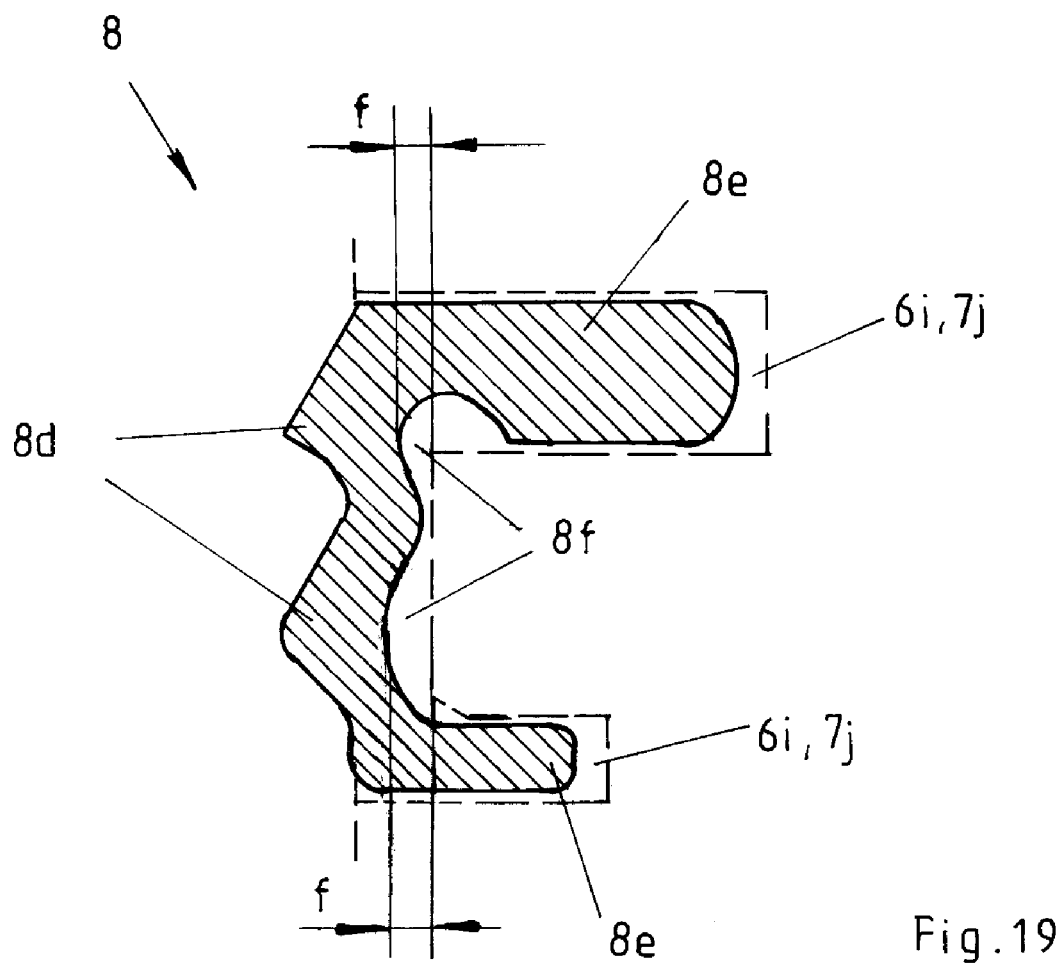
Figure 20A:
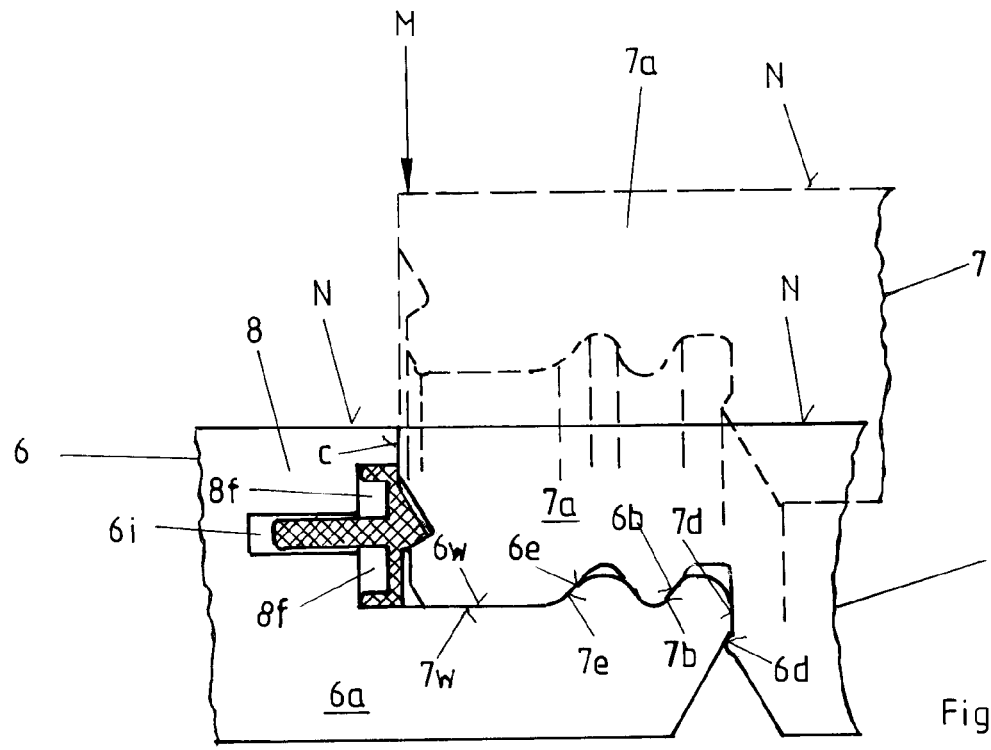
Figure 20B:
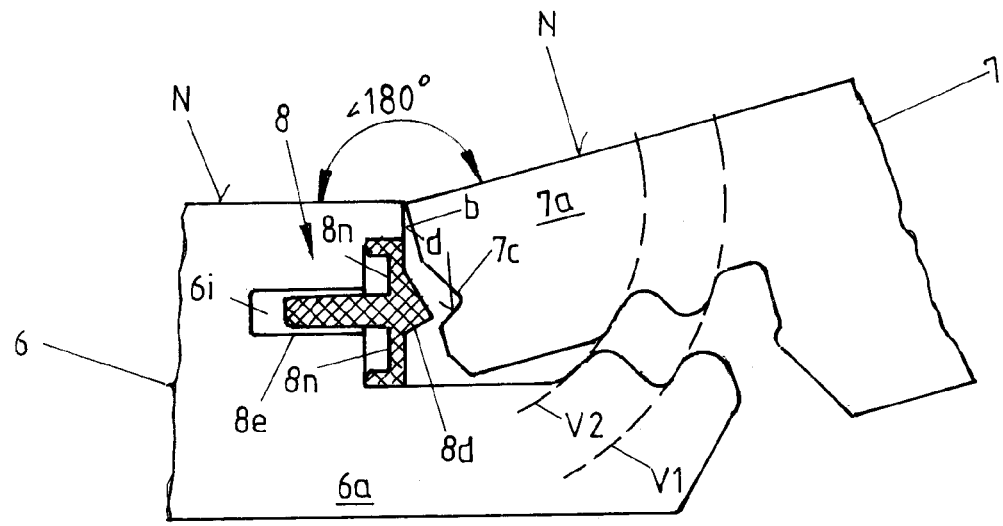

FIGS. 4a and 4b show a vertical locking element on the lower hook element and an additional profile undercut configuration at the free outer edge of the lower hook element in the assembled condition, FIGS. 5a and 5b show a pair of hook elements with a vertical locking element on the lower hook element and two horizontally effective undercut-configuration surfaces on the hook elements, FIGS. 6a and 6b show the embodiment of FIGS. 5a and 5b with an additional, vertically effective undercut configuration at the free outer edge of the lower panel, FIGS. 7a and 7b show a pair of corresponding hook elements with a vertical locking element arranged on the upper panel, FIGS. 8a and 8b show the embodiment of FIGS. 7a and 7b with an additional vertically effective undercut configuration in the region of the free outer edge of the upper panel, FIGS. 9a and 9b show the embodiment of FIGS. 5a and 5b with an alternative vertical locking element, FIGS. 10a and 10b show an embodiment of complementary hook elements with a vertical locking element as shown in FIGS. 9a and 9b, FIGS. 11a and 11b show an embodiment as shown in FIGS. 9a and 9b, wherein the vertical locking element is provided in kinematically reversed relationship on the hook element of the upper panel, FIGS. 12a and 12b show an embodiment as shown in FIGS. 11a and 11b, wherein an undercut configuration effective in the vertical direction is provided at the free outer edge of the lower panel in the assembled condition of the panels, FIGS. 13a and 13b show an embodiment as shown in FIGS. 3a and 3b with an alternative vertical locking element on the lower hook element, FIGS. 14a and 14b show an embodiment as shown in FIGS. 13a and 13b, with the vertical locking element provided on the upper hook element, FIGS. 15a and 15b show a combination of the embodiments of FIGS. 13a and 14a, FIG. 16 shows a vertical locking element, FIG. 17 shows a plan view of an alternative vertical locking element, FIG. 18 shows a cross-sectional view of the vertical locking element along line XVIII-XVIII in FIG. 17, FIG. 19 shows a further type of a vertical locking element, and FIGS. 20a and 20b show an embodiment as shown in FIGS. 6a and 6b with an alternative vertical locking element on the lower hook element.

Figure 1:
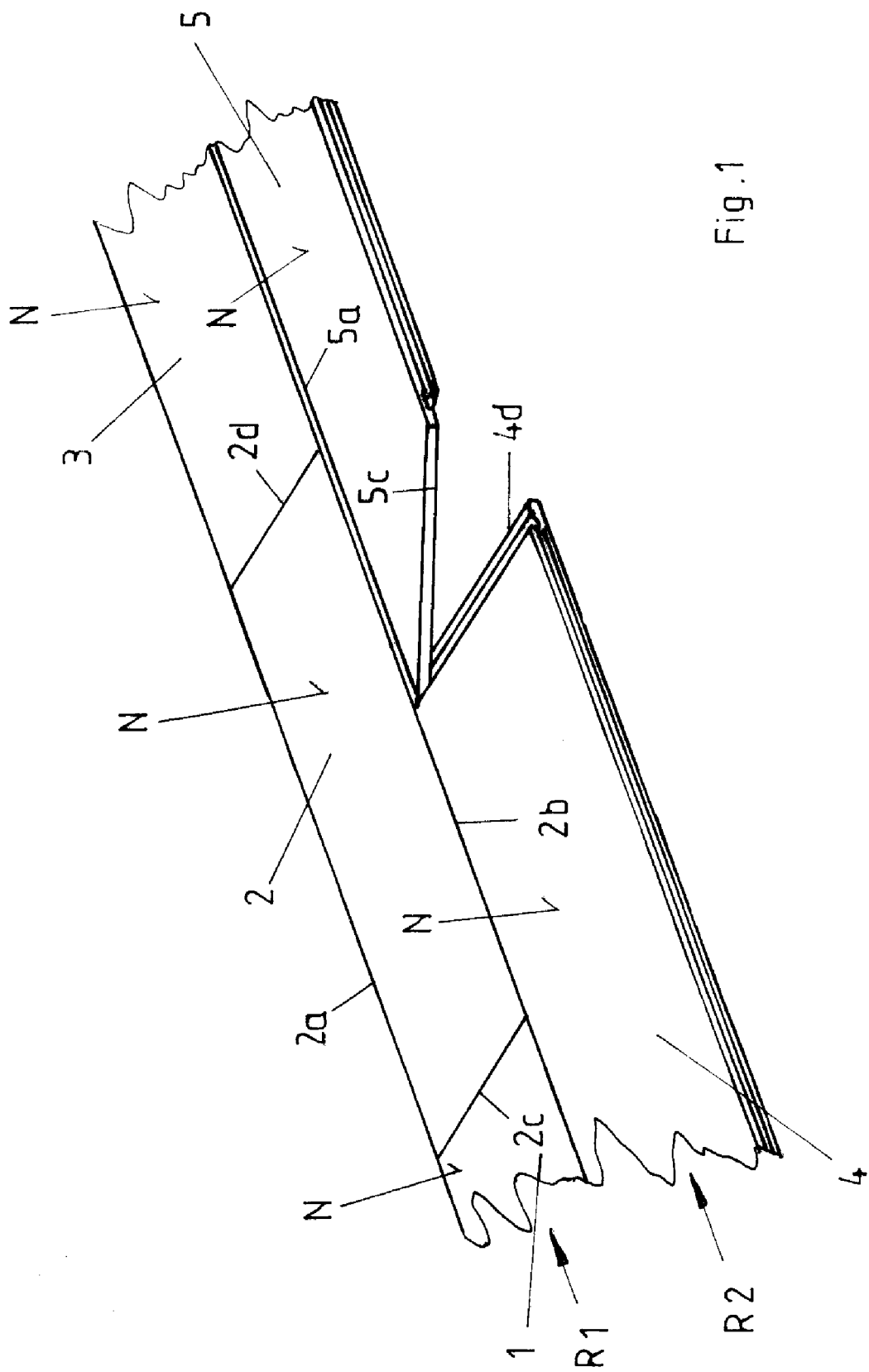
Figure 2A:
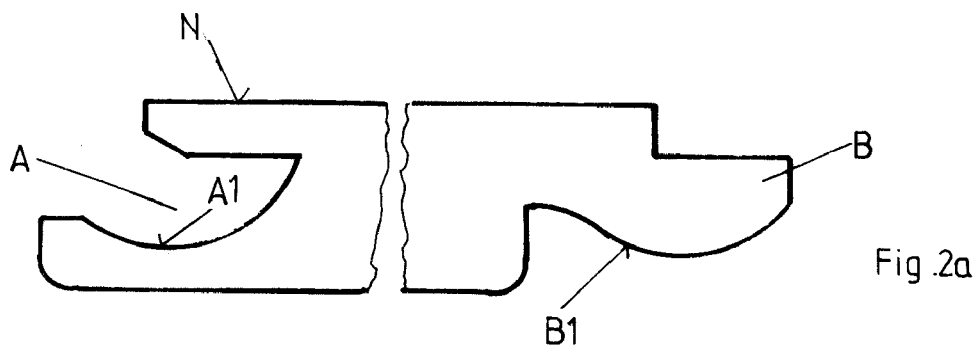
Figure 2B:
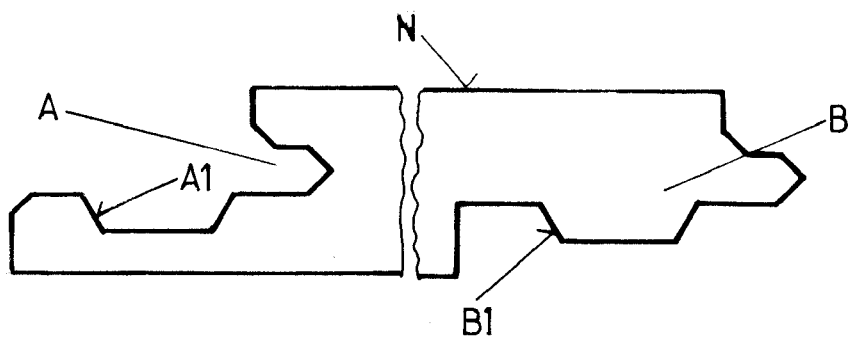
Figure 2C:
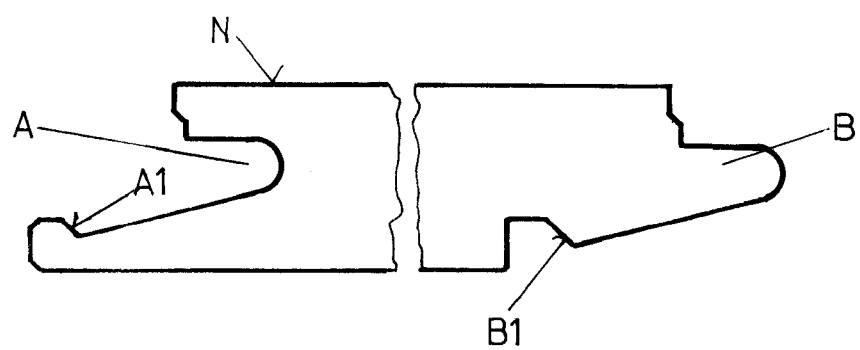
Figure 2D:
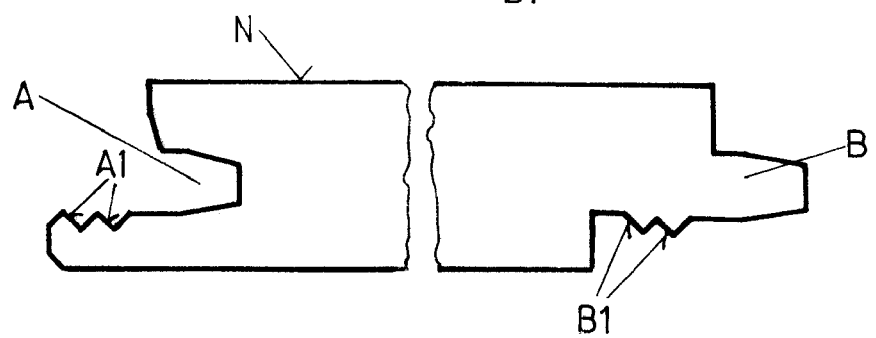
Figure 2E:
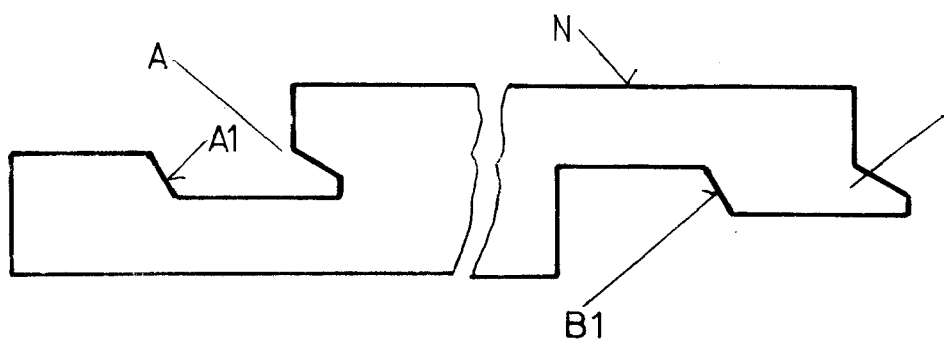

FIG. 1 shows a floor covering B which has been begun, comprising panels according to the invention. Portions of two rows of panels R1 and R2 comprising similar panels 1, 2, 3, 4 and 5 can be seen therein.

The panel 2 according to the invention is of a quadrangular shape. It is provided with a working surface N and holding profiles 2a, 2b, 2c and 2d are arranged at the four edges of the panel 2. The panel 2 has two pairs of edges. Each pair of edges is formed from two oppositely disposed edges provided with corresponding holding profiles. In the present example the panel 2 has two parallel long edges 2a and 2b and two short edges 2c and 2d which are respectively disposed in opposite parallel relationship. At the short edges 2c and 2d of the panel 2 it is connected to further panels 1 and 3 in the same row R1. The indication in respect of the edges applies in the same fashion for the other panels 1, 3, 4 and 5. At the long edge 2b the panel is connected to the panels 4 and 5 of the following row R2. A new row of panels can be respectively attached to each laid row of panels. That is preferably effected by attaching individual panels by building up a fresh row of panels in a step-wise procedure.

FIG. 1 further shows how the panel 5 as a fresh panel is connected to the panels 2 and 3 of the previous row R1, by angular movement into interlocking relationship. FIG. 1 shows the new panel 5 in a plane arranged inclinedly relative to the plane of the panels 2 and 3 of the previous row R1. A long edge 5b of the fresh panel 5 is attached to the long edges 2b and 3b of the panels 2 and 3 of the previous row R1. The holding profiles of the first pair of edges, which are inserted into each other at the long edges, are automatically locked together by downward pivotal movement of the fresh panel 5 into the plane of the panels of the previous row R1. The holding profiles of the long edges of the panels then prevent the panels from being moved away from each other in the common plane, more specifically perpendicularly to the long edges.

At the same time the angular movement into interlocking relationship also causes a connection between the short edge 5c of the fresh panel 5 and the short edge 4d of the panel 4 already disposed in the same row R2. Due to the angular movement into interlocking relationship, at the short edges 4d/5c there is a scissor-like movement which moves the short edge 5c of the fresh panel 5 towards the short edge 4d of the lying panel 4. In connection with locking of the short edges, the angular movement into interlocking relationship is also referred to as a folding movement.

FIGS. 2a to 2e show shapes of holding profiles which are known from the state of the art and which are suitable for the angular movement into interlocking relationship.

Usually, a groove edge A of the panels of a previous row is provided for the connection of a following row. Therefore, in general terms, an edge of a fresh panel, which edge is provided with a tongue B, is respectively attached to the groove edge A of the panels of the previous row, the fresh panel being arranged in an inclined plane as shown in FIG. 1. That groove edge has at least one respective undercut-configuration surface A1 and the tongue edge has a respective undercut-configuration surface B1, which surfaces in the locked condition oppose movement of the panels away from each other in the plane of the panels, and more specifically perpendicularly to the locked groove and tongue edges A/B. A top side of the panels is provided with a working surface N.

The panel shown in FIGS. 3a to 15b has a core material comprising a wood fibre material. The holding profiles are milled on the edges which can comprise the core material or can involve a particular edge material.

FIGS. 3a to 15b show holding profiles in the form of hook elements 6a and 7a. Those hook elements are arranged at least on that pair of edges of a panel 1, 2, 3, 4 and 5 as shown in FIG. 1, which can be assembled to a similar adjacent panel 1, 2, 3, 4 and 5, by a scissor-like movement (folding movement). All examples of hook elements in FIGS. 3a to 15b are thus suitable for the edges 2c/2d of the panel 2 in FIG. 1 or for the edges 4d/5c to be hooked, of the similar panels 4 and 5 in FIG. 1.

The use of the hook elements 6a and 7a in FIGS. 3a to 15b for a scissor-like joining movement is however not the only possible kind of joining arrangement, as will also be discussed hereinafter.

What is common to all embodiments shown in FIGS. 3a to 15b is the preferred kind of joining system in which a fresh panel 7 which is shown as a portion thereof in FIG. 3a by an upper hook element 7a illustrated in broken line is moved by a scissor-like movement towards a lower hook element 6a of the adjacent panel 6 and is brought into hooking engagement therewith. Hereinafter that hook element towards a working surface N is always referred to as the upper hook element 7a and the complementary hook element is correspondingly always identified as the lower hook element 6a.

FIGS. 3a to 15a which are indicated by the appended letter 'a' show on the one hand the panel to be moved with a scissor-like movement, by means of the broken-line upper hook element 7a; on the other hand, the finished hooked position of the upper hook element 7a in the lower hook element 6*a* is respectively shown by a solid line. In the hooked position, a vertical locking element 8 arranged within the connection is automatically brought into latching engagement and prevents the two panels 6 and 7 from moving away from each other perpendicularly to the plane of the panels.

So that the panels 6 and 7 also cannot be moved away from each other in the plane of the panels and more specifically perpendicularly to the hooked edges, the hook element 6 is provided with an undercut surface 6*b* co-operating with an undercut surface 7*b* of the panel 7.

In order to separate again the connected condition shown in FIG. 3, that panel 7 which is shown in broken line in FIG. 3*a* is pivoted upwardly into an inclined position as shown in FIG. 3*b* and in that way moved into an unlocking position. The pivotal movement is effected about a pivot axis arranged parallel to the hook elements 6*a*/7*a* or on an unlocking curve V1 and V2 respectively which in the present embodiment are circular but which can also differ from a circular shape. In the unlocking position the working surfaces N of the two panels 6 and 7 assume an angle which is less than 180°.

In that respect it is sufficient if the panel 7 which is pivoted upwardly for unlocking purposes is pivoted upwardly to such an extent that the undercut surfaces 6*b*/7*b* of the hook elements 6*a*/7*a* which prevent the two panels 6 and 7 from moving apart in the plane of the panels and more specifically perpendicularly to the hooked edges have slid past each other, due to the upward pivotal movement, to such an extent that the undercut surfaces 6*b*/7*b* are out of contact. The panel 7 can then be simply removed.

Referring to FIGS. 3*a* and 3*b*, there is provided a vertical locking element 8 having an elastically resilient latching tongue 8*a* which is resiliently movable in the cross-sectional plane shown in FIGS. 3*a* and 3*b*. The vertical locking element 8 has an insert portion 8*b* with which it fits in a recess 6*c* provided for that purpose at the edge of the hook element 6*a*. In the present case the recess 6*c* is of a two-stage configuration with a narrow deep region and a wider region of lesser depth. At the opening of the recess the latching tongue 8*a* of the vertical locking element 8 projects from the edge of the hook element 6*a*. The resilient latching tongue 8*a* projects into a path of joining movement M on which the hook element 7*a* shown in broken line in FIG. 3*a* must be moved to move into the hooked position shown in FIG. 3. The insertion portion 8*b* of the vertical locking element 8 is arranged in the hook element 6*a* of the panel 6, in such a way that it cannot be lost therefrom.

The path of joining movement M of the upper hook element 7*a* is enabled under a counteracting pressure in respect of the upper hook element 7*a*. After the counteracting pressure is stopped the latching tongue 8*a* of the vertical locking element 8 automatically moves into the path of joining movement M again due to the stored spring energy, and thereby blocks that path of movement.

Where the vertical locking element 8 projects into the path of joining movement M, there are provided dust chamber regions S so that possible building site dust can pass within the hook connection into regions where the dust does not adversely affect the function of the hook elements 6*a*/7*a* and the vertical locking element 8. Those dust chamber regions S can be provided in all embodiments of FIGS. 3*a* to 15*b*.

The lower hook element 6*a* has a joining surface b which in the hooked condition is in contact with a joining surface c of the upper hook element. The joining surfaces b and c which are thus in mutually butting relationship ensure that the surface of a floor covering B has no gap because the working surface N of a panel directly adjoins the working surfaces N of the adjacent panels. It will be appreciated that the corners between the joining surfaces b and c respectively and the working surface N can also be bevelled or rounded.

In the hooked condition a gap I is provided between the free outer edge of the lower hook element 6*a* and the region of the upper hook element 7*a*, that is set back from the outer edge. Upon assembly of the hook elements 6*a*/7*a* the resilient automatic latching engagement of the vertical locking element 8 can be readily felt by the user because it is the only resistance opposed to the joining movement on the path M of joining movement.

So that the resilient latching tongue 8*a* of the vertical locking element 8, that during the joining movement is automatically moved out of the path M of joining movement by the upper hook element 7*a* shown in broken line, namely it is pushed back, can produce a locking action, a latching recess 7*c* is provided at the outer edge of the upper hook element 7*a*. The latching tongue automatically resiliently moves into the latching recess 7*c* and in that way passes into the path M of joining movement of the upper hook element 7*a* again. In that case the latching tongue 8*a* bears resiliently against an inclined latching surface d of the latching recess 7*c*.

It is provided that the undercut surfaces 6*b*/7*b* of the hook elements 6*a* and 7*a* are so arranged that they are on the unlocking curve V. In the present case the undercut surfaces of the hook elements are of a cylindrically curved shape. It is however also possible to provide flat or also oppositely curved undercut surfaces. Under some circumstances the undercut surfaces would be subjected to elastic deformation when the panels are moved out of a flat position into the unlocking position shown in FIG. 3*b*. The elastic deformation can be tolerated if it does not hinder the function of the hook elements.

The working surface N of the panel 6 and the working surface N of the panel 7 are on one level. A loading on the working surface N in the region of the upper hook element 7*a* presses a contact surface 7*w* of the upper hook element 7*a* against a support surface 6*w* of the lower hook element 6*a*. In the hooked condition of the hook elements 6*a*/7*a* the contact surface 7*w* and the support surface 6*w* are in contact so that there cannot be any difference in height because of a hollow space between the contact surface 7*w* and the support surface 6*w*. Furthermore, as shown in broken line in FIG. 3*a*, a dust chamber region S can be provided in the contact surface; that applies to all embodiments in FIGS. 3*a* to 15*b*.

Referring to FIG. 3*c*, disclosed therein is an additional structure which dispenses with simple unlockability of the hook connection. A panel with hook elements 6*a* and 7*a* modified in that way has particularly good strength when it is moved apart with a hooked panel in the plane of the panels and more particularly perpendicularly to the hooked edges (horizontally). In that case the undercut surfaces 6*b*/7*b* which prevent the above-mentioned horizontal movement of the panels 6 and 7 away from each other are no longer arranged on an unlocking curve. It will be appreciated that this can be provided in all embodiments of hook elements as shown in FIGS. 3*a* to 15*a* if the arrangement does not involve unlockability about a pivot axis or along an unlocking curve.

Another embodiment of hook elements is shown in FIGS. 4*a* and 4*b*. This structure differs from the embodiment of FIGS. 3*a* and 3*b* only in that the gap I is missing and instead the arrangement involves contact between the edges. As shown in FIG. 4*a* the hook elements 6*a*/7*a* more specifically have contact surfaces 6*d*/7*d* of an undercut configuration, which are such that during the vertical joining movement as shown in FIG. 4*a* compulsion and elastic deformation are required to bring the contact surfaces into the illustrated contact position. In addition the contact surfaces 6*d*/7*d* are so shaped that they can slide past each other to achieve the unlocking position shown in FIG. 4*b*, without involving substantial elastic deformation. In that case the contact surfaces 6*d*/7*d* are subject to a lesser degree of wear than during the joining movement.

The embodiment of FIGS. 5*a* and 5*b* is provided with the same vertical locking element 8 as in FIGS. 3*a* and 4*a*. The joining movement for hooking engagement of the hook elements 6*a* and 7*a* of the two panels 6 and 7 is once again a scissor-like movement in which the panel 7 with the upper hook element 7*a*, shown in broken line, is moved in a scissor-like movement towards the panel 6 with the lower hook element 6*a*. Provided at the free outer edge of the lower hook element 6*a* there is a gap I relative to the set-back part of the edge of the upper hook element, as in FIG. 3*a*. FIG. 5*a* differs from FIG. 3*a* in the number of undercut surfaces of the hook elements, which prevent the panels from moving apart in the plane of the panels and more particularly perpendicularly to the hooked edges (horizontally). As shown in FIG. 5*a* provided at each hook element 6*a* and 7*a* respectively are two undercut surfaces 6*b* and 6*c*, 7*b* and 7*e* respectively, which are disposed on two unlocking curves V2 and V2. The step of providing each of the hook elements 6*a* and 7*a* with two undercut surfaces disposed one behind the other provides a higher degree of strength to prevent the panels 6 and 7 from moving apart in the horizontal direction, more specifically perpendicularly to the hooked edges.

Referring to FIG. 5*b* the undercut surfaces are so shaped that pivotal movement without any problem of the panel 7 with the upper hook element 7*a* into the unlocking position is possible, in which the working surfaces N of the panels 6 and 7 assume an angle relative to each other, which is smaller than 180°.

A further embodiment is shown in FIGS. 6*a* and 6*b*. It only differs from FIGS. 5*a* and 5*b* in that, at the panel 6 provided with the vertical locking element 8, with the lower hook element 6*a*, at the free outer edge thereof, it involves contact with a set-back edge of the upper hook element 7*a* of the adjacent panel 7. There are contact surfaces 6*d*/7*d* of an undercut configuration, which in a scissor-like joining movement along the path M of joining movement, as shown in FIG. 6*a*, pass into their locked position by elastic deformation. In the assembled condition the contact surfaces 6*d*/7*d* have a locking action to prevent the panels 6 and 7 from moving apart in the perpendicular plane in which the joining movement takes place.

FIG. 6*b* makes it clear that the above-described contact surfaces can slide past each other for the purposes of unlocking or also for joining the hook elements 6*a* and 7*a* by angular movement into interlocking relationship.

FIGS. 7*a* and 7*b* show an embodiment of hook elements 6*a* and 7*a* which provide a vertical locking element 8 on the upper hook element 7*a* shown in broken line in FIG. 7*a* and which is joined by a scissor-like joining movement to the lower hook element 6*a* of an adjacent panel 6. The vertical locking element 8 is arranged in a region set back from the outer edge of the upper panel 7 and co-operates with the outer edge of the panel 6 provided with the lower hook element 6*a*. For that purpose, a latching recess 6*f* with an inclined latching surface d is provided at the outer edge of the lower hook element 6*a*. When the upper hook element 7*a* is lowered from the position shown in broken line on to the lower hook element 6*a* in a scissor-like joining movement, that involves automatic movement of the latching tongue 8*a* of the vertical locking element 8, which movement firstly automatically pushes the resilient latching tongue 8*a* back out of the path M of joining movement, by contact with the lower hook element 6*a*. When the hook elements have reached their locked positions shown in FIG. 7*a* the resilient latching tongue 8*a* has automatically moved forwardly into the path M of joining movement again, by being resiliently moved into the free space formed by the latching recess 6*f*, and bearing resiliently against the latching surface d.

Referring to FIG. 7*b* the hook elements 6*a* and 7*a* have undercut surfaces 6*b* and 7*b* respectively co-operating for locking in the plane of the panels and perpendicularly to the hooked edges (horizontally). Those undercut surfaces 6*b*/7*b* are arranged on an unlocking curve V. To release the hook elements 6*a* and 7*a* from each other the panel 7 with the upper hook element 7*a* is pivoted upwardly about the hooked edges and moved into the unlocking position. In the unlocking position the working surfaces N of the panels 6 and 7 are at an angle to each other, which is less than 180°.

FIGS. 8*a* and 8*b* show a further embodiment. This very substantially corresponds to that shown in FIGS. 7*a* and 7*b*. The sole modification lies in the addition of an undercut configuration effective in a vertical direction. That undercut configuration is provided at the free outer edge of the panel 7 with the upper hook element 7*a*.

The free outer edge of the upper hook element 7*a* is provided with a depression having a latching surface 7*g*. At the corresponding location of the set-back region of the edge of the panel 6 provided with the lower hook element 6*a* there is a projecting contact element 6*g* co-operating with the latching surface 7*g* of the depression in the adjacent panel 7. In the locked position shown in FIG. 8*a* of the hook elements 6*a* and 7*a*, the contact element 6*g* projecting into the depression provides a locking action to prevent the panels 6 and 7 from moving apart in a direction perpendicular to the plane of the panels. Unlocking is effected as shown in FIG. 8*a* and as also in the preceding embodiments. It will be seen that the additional locking action afforded by the contact element 6*g* jointly with the associated latching surface 7*g* of the depression is pivoted apart for unlocking purposes without elastic deformation being required for that purpose at the contact location of the contact element.

The embodiment of FIGS. 9*a* and 9*b* substantially corresponds to the embodiment of FIGS. 5*a* and 5*b*, but with an alternative vertical locking element 8 being provided at the same fitment position. The vertical locking element 8 is bendable in the manner of a leaf spring and is also of such a configuration that it can be automatically urged out of the path M of joining movement of the upper hook element 7*a* and in so doing absorbs spring energy. When the two hook elements 6*a* and 7*a* have moved into the locked position shown in FIG. 9*a* the vertical locking element 8 is automatically moved forwardly into the path M of joining movement again by the stored spring energy and passes into a latching recess 7*c* in the hook element 7*a*.

The vertical locking element 8 is arranged in a plane parallel to the working surface N of the panel 6. For that purpose a groove-shaped recess 6*h* is provided on the lower hook element 6*a*. The recess 6*h* extends along a set-back region of the edge of the lower hook element 6*a*. The resilient movement of the vertical locking element 8 also takes place in that plane which is parallel to the working surface N. The vertical locking element 8 is resiliently movable in the recess 6*h*, in parallel relationship with the plane of the panel and more specifically substantially perpendicularly to the panel edge. In the unstressed condition it projects into the path M of joining movement of the upper hook element 7*a*. Because the vertical locking element 8 must be capable of moving in the recess 6*h* the fitting engagement shape for the vertical locking element 8 in the recess 6*h* is in the form of an easy sliding fit.

That therefore prevents it from being clamped fast therein. The vertical locking element 8 has an inclined motion surface 8c serving as a contact surface for the upper hook element 7a. When the upper hook element 7a bears in its joining movement M against the inclined motion surface 8c the leaf spring-like vertical locking element 8 is elastically deformed and is moved in the direction of the groove bottom of the recess 6h. In that way the path of joining movement is temporarily cleared for the upper hook element 7a. In the hooked condition there is a gap I between the free outer edge of the lower hook element 6a and the region of the upper hook element 7a, that is set back from the outer edge. Upon assembly of the hook elements 6a/7a resilient automatic engagement of the vertical locking element 8 can be readily felt by the user because it is the only resistance opposed to the joining movement on the path M.

It will be seen by reference to FIG. 9b that the alternative vertical locking element 8 also ensures unlocking without any problem, in that the panel 7 provided with the upper hook element 7a is pivoted on an unlocking curve V1 or V2 into an unlocking position in which the working surfaces N of the panels 6 and 7 occupy relative to each other an angle of less than 180°.

Depending on the respective shape of the projecting region of the vertical locking element 8 and the shape of the latching recess 7c provided at the outer edge of the upper hook element for receiving the part of the vertical locking element 8, that can be resiliently moved into and out of the path of joining movement, it can happen that, as shown in FIG. 9b, an unlocking movement pushes the vertical locking element 8 back into the recess 6h somewhat so that the panel 7 which is pivoted upwardly as shown in FIG. 9b can pass into the unlocking position illustrated.

FIGS. 10a and 10b shown an embodiment which very substantially corresponds to that of FIGS. 9a and 9b. It differs from the embodiment of FIGS. 9a and 9b only in that there is no gap I and instead the edges are in contact. As shown in FIG. 10a more specifically the hook elements 6a/7a have contact surfaces 6d/7d of an undercut configuration, which are so designed that, during the vertical joining movement, as shown in FIG. 10a, compulsion and elastic deformation is required to bring the contact surfaces into the illustrated contact position. In addition the contact surfaces 6d/7d are of such a shape that they can slide past each other to achieve the unlocking position shown in FIG. 10b, without involving substantial elastic deformation. In that case the contact surfaces 6d/7d are subject to a lesser degree of wear than during the joining movement.

FIG. 10b shows that the panel 7 with the upper hook element 7a is pivoted upwardly along an unlocking curve V1 or V2 respectively to reach an unlocking position. In that case all undercut surfaces 6b/7b and 6e/7e of the hook elements 6a and 7a as well as the above-described contact surfaces 6d/7d are moved in sliding relationship along each other without causing any elastic deformation worth mentioning of the hook elements 6a and 7a.

FIGS. 11a and 11b show an embodiment which very substantially corresponds to that shown in FIGS. 10a and 10b. The vertical locking element 8 however is arranged in kinematically reversed relationship. This means: the vertical locking element 8 is no longer arranged at the set-back edge of the lower hook element 6a but at the free outer edge of the upper hook element 7a. For that reason the upper hook element 7a has a groove-shaped recess 7h which has the same properties as the above-described groove-shaped recess 6h in FIG. 10a. The inclined motion surface 8c of the vertical locking element 8 as shown in FIG. 11a is arranged for the purposes of kinematic reversal on the side of the groove-shaped recess 7h, that is remote from the working surface N, so that it is urged into the groove-shaped recess 7h in a horizontal direction by contact with the lower hook element 6a, initiated by the vertical joining movement, and stores spring energy.

When the two hook elements 6a and 7a have moved into the locked position shown in FIG. 11a the vertical locking element 8 is automatically advanced into the path M of joining movement again by the stored spring energy and moves into a latching recess 6f in the hook element 7a.

Reference will now be made to FIG. 11b showing that in this example the panel with the upper hook element 7a can be pivoted up along an unlocking curve so as to reach an unlocking position in which the working surfaces N of the panels 6 and 7 assume an angle relative to each other which is less than 180°. It can also be seen from FIG. 11b that the vertical locking element 8 during the unlocking movement is simply pivoted away from contact with the latching surface d of the latching recess 6f in the lower hook element 6a without the vertical locking element 8 having to be pushed deeper into the recess 7h. The undercut surfaces 6b/7b and 6e/7e which are provided on the hook elements 6a and 7a and which serve for horizontal locking of the hook elements 6a and 7a slide past each other until they are out of contact.

The embodiment of FIG. 12a very substantially corresponds to that shown in FIG. 11a, but the locking action is reinforced perpendicularly to the plane of the panels (vertically) because the outer free edge of the lower hook element has a contact surface 6e which in the connected condition as shown in FIG. 12a is in contact with an undercut contact surface 7e on a set-back region of the edge of the upper hook element 7a of the adjacent panel 7. To bring the undercut contact surfaces 6e/7e into engagement by a scissor-like joining movement, elastic deformation is required at the contact surfaces.

All embodiments shown in FIGS. 4a, 6a, 10a and 12a have at the free outer edge of the lower hook element 6a a contact surface 6e of an undercut configuration, which is in contact with an adjacent panel. The degree of undercutting in a vertical direction is correspondingly slight so that the elastic deformation necessary in the joining movement, to pass over the undercut configuration, does not damage the hook elements 6a and 7a so that the locking action of the contact surfaces 6e and 7e is adversely affected.

FIGS. 13a and 13b show an embodiment substantially corresponding to that shown in FIG. 3a. This arrangement only has a particular configuration of a vertical locking element 8. The particular vertical locking element 8 is arranged at the same fitment location on the lower hook element 6a as the vertical locking element 8 in FIG. 3a. The hook elements 6a and 7a are provided with co-operating undercut surfaces 6b and 7b respectively to provide a locking action to prevent the panels 6 and 7 from moving apart in the plane of the panels and more specifically perpendicularly to the hooked edges. The vertical locking element 8 has resilient contact means 8d which project in an arcuate or prong-like configuration and which produce a locking action in a vertical direction, namely perpendicularly to the plane of the panels, insofar as they clear the path M of joining movement for the upper hook element 7a under a counteracting pressure in respect of the upper hook element 7a and, after elimination of the counteracting pressure, they automatically move due to the stored spring energy and advance into the path of joining movement again and block it. The contact means 8d are arranged at a set-back region of the edge of the lower hook element 6a. In addition the vertical locking element 8 has two insert regions 8e which approximately correspond to the insert portion in FIG. 3a. Groove-shaped recesses 6i are provided in the lower hook element 6a for the insert regions 8e. The insert regions Se of the vertical locking element 8 can be received in the groove-shaped recesses 6i in such a way that they can be moved forward and back therein. In that way they contribute to clearing the path M of joining movement and blocking it again, from time to time. On the other hand the insert regions 8e can be fixedly connected to the groove-shaped recesses 6i, for example by a pressed connection by virtue of oversize and/or by an adhesive in the groove-shaped recesses 6i. It is also desirable if only one of the insert regions 8e is fixedly connected in the groove-shaped recesses 6i and the second insert region 8e is movable in its groove-shaped recesses 6i.

A free space 8f is provided between each of the contact means 8d and the edge at which the vertical locking element 8 is disposed. To move the projecting contact means 8d out of the path M of joining movement of the upper hook element 7a the contact means 8d are automatically pressed against the edge of the lower hook element 6a. In that case the contact means 8d are resiliently deformed and pressed into the above-mentioned free spaces 8f. The free spaces are reduced in size as a result. In the locked position of the hook elements 6a and 7a, as shown in FIG. 13a, the contact means 8d have resiliently advanced again and engage into corresponding latching recesses 7a provided for that purpose at the outer edge of the upper hook element 7a. The free spaces 8f behind the contact means 8d have increased in size again, in the locked condition of the two hook elements 6a and 7a.

It is to be noted at this juncture that a locking action to prevent the panels 6 and 7 from moving apart in a direction perpendicular to the plane of the panels also already occurs when the vertical locking element 8 has only one contact means 8d and an insert region 8e, as described hereinafter with reference to FIGS. 20a and 20b. In addition a vertical locking element 8 which has two contact means 8d and two free spaces 8f disposed therebehind, as shown in FIGS. 13a and 13b, can alternatively be provided with only one insert region 8e so that only one groove-shaped recess 6i also has to be provided in the lower hook element. In the case of a vertical locking element 8 with two contact means 8d and an insert region 8e, the insert region for example can be so arranged that it is disposed centrally between the two free spaces 8f of the contact means 8d.

FIG. 13b shows how two hooked panels 6 and 7 can be released from each other. For that purpose the panel 7 with the upper hook element 7a is pivoted upwardly along an unlocking curve V into an unlocking position in which the working surfaces N of the panels 6 and 7 are at an angle relative to each other, of less than 180°. In that case, for the function of the unlocking effect, as in each of the above-described embodiments, it is crucial that all undercut surfaces 6b and 7b which are in contact with each other for locking purposes are brought out of contact in the unlocking position.

FIGS. 14a and 14b show an embodiment which very substantially corresponds to the embodiment of FIGS. 13a and 13b, wherein the same vertical locking element 8 is only disposed at a different installation location, namely the upper hook element 7a which for that purpose is provided with groove-shaped recesses 7j. For that purpose the lower hook element 6a is provided with the corresponding latching recesses 6j into which the contact means 8d of the vertical locking element 8 can resiliently engage. The functions of the other features indicated by means of the references are in each case the same as in the embodiment of FIG. 13a to which reference is directed. The unlocking effect shown in FIG. 14b is implemented in the same manner as in FIG. 13b by upward pivotal movement of the panel 7 along an unlocking curve V.

FIGS. 15a and 15b combine the embodiment of FIG. 13a with the embodiment of FIG. 14a. More specifically a vertical locking element 8 is arranged at each of the hook elements 6a and 7a. Both vertical locking elements 8 are suitable for being latched to each other. They act against release of the panels 6 and 7 in a direction perpendicularly to the plane of the panels. Unlocking is shown in FIG. 15b and is implemented in the same manner as unlocking in the above-described embodiments of FIGS. 13b and 14b. The function of the features indicated by means of the references are in each case the same as in the embodiments of FIGS. 13a/13b and 14a/14b to which reference is hereby directed.

FIG. 16 shows a view on an enlarged scale in cross-section of a vertical locking element 8 as can be used in the embodiments of FIGS. 3a to in 8b. The vertical locking element 8 has an insert portion 8b provided with anchoring means. With the insert portion, the vertical locking element 8 can be inserted into a recess 6c and 7f respectively of a respective hook element 6a and 7a. A connection between the insert portion 8b of the vertical locking element 8 and the recess 6c and 7f of the hook element 6a and 7a respectively can be based on a press connection or on the use of an adhesive. The anchoring means of the insert portion 8b have a contact surface 8g which in the assembled condition bears against a side wall of the recess 6c and 7f respectively of a hook element. The anchoring means of the insert portion 8b, on the side opposite the contact surface 8g, have mutually juxtaposed projecting holding elements 8h. Intermediate spaces 8i are provided between the holding elements 8h. If the insert portion 8b is to be connected to the recess 6c and 7f respectively by way of a press connection, the recess 6c and 7f respectively must be of a smaller width than the insert portion 8b of the vertical locking element 8. That provides for a high level of pressure in relation to area and elastic deformation of the materials in contact with each other, at the contact locations at which the holding elements 8h are in contact with the recess 6c and 7f of the hook element 6a and 7f respectively. In that way the vertical locking element 8 is fitted to the hook element 6a and 7a respectively, in such a way that it cannot be lost. If a press connection is not wanted, the recess can be of a width greater than the width of the insert portion 8b of the vertical locking element 8. The insert portion 8b can however be connected to the recess 6c and 7f respectively by introducing an adhesive. It is advantageous in that respect that the intermediate spaces 8i between the holding elements 8h of the insert portion 8b can form a reservoir for adhesive.

At the free end of the insert portion 8b, an inclined surface 8j adjoins the contact surface 8g of the insert portion 8b. That inclined surface 8j serves to make it easier to insert the insert portion 8b into the recess 6c and 7f respectively during the assembly operation. The inclined surface 8j provides that the free end face of the insert portion 8b is of a markedly smaller width than the width of the opening of the recess 6c and 7f respectively so that as a result the insert portion 8b can be easily fitted into the opening of the recess 6c and 7f respectively. At the end opposite the inclined surface 8j, a laterally projecting shoulder 8k adjoins the contact surface 8g of the insert portion 8b. In the assembled condition the shoulder 8k is in contact with a bottom of a wider region of the recess 6c and 7f respectively of a hook element 6a and 7a respectively. In the FIG. 16 embodiment the shoulder 8j serves to limit the depth of engagement of the vertical locking element 8 in the recess 6c and 7f respectively. In contrast, a spacing relative to the bottom of the recess 6c and 7f respectively is provided at the free end of the insert portion 8b.

Adjoining the shoulder 8k is a support surface 8m oriented substantially parallel to the contact surface 8g. In the present embodiment the support surface 8m is in contact with the lateral wall of the wider region of the recess 6c and 7f respectively of the hook element 6a and 7a respectively. It serves to carry forces applied to an inclinedly projecting resilient latching tongue 8a which is at the end of the cross-section of the vertical locking element 8, that is opposite to the insert portion 8b. The free end of that latching tongue 8a is towards that side of the vertical locking element 8, at which the holding elements 8h of the insert portion 8b are arranged. The latching tongue 8a has two side surfaces, namely an outer surface 8n and an inner surface 8p. Formed between the support surface 8m and the outer surface 8n of the latching tongue 8a is an angle greater than 90° and smaller than 180°. An indentation 8r is provided on the inside 8p of the latching tongue 8a at the foot end thereof. The indentation 8r reduces the cross-section of the foot of the latching tongue 8a in order in that way to promote resilient bending of the latching tongue 8a in the direction of the insert portion 8b.

The vertical locking element 8 is produced in the form of an extruded part and prepared in the form of an article available by the metre. Locking element portions therefore have to be cut off the article in order to equip an edge provided with a hook element, with a vertical locking element 8 of suitable length. Desirably a vertical locking element 8 is somewhat shorter than the edge of the respective panel to avoid a portion of the vertical locking element 8 projecting therefrom.

FIG. 17 shows an embodiment of a vertical locking element 8 as can be used for hook elements 6a and 7a respectively as shown in FIGS. 9a to 12b. It is designed in the manner of a flexible leaf spring which, when it is arranged in a recess 6h and 7h respectively of a hook element 6a and 7a respectively, has a maximum spring travel f. Provided at one side of the vertical locking element 8 is an inclined motion surface 8c which in the present embodiment extends over a part of the length L of the vertical locking element 8. A cross-section through the vertical locking element 8 is shown in FIG. 18, also indicating the maximum spring travel f. FIG. 18 also shows the shape of the inclined motion surface 8c. The inclined motion surface 8c serves as a contact surface for a hook element 6a and 7a respectively which presses against the inclined motion surface 8c from a direction perpendicular to the surface of the vertical locking element 8 and by virtue of the vertical joining movement of the moved hook element 6a or 7a respectively, causes a horizontal resilient movement of the vertical locking element 8. In that case spring energy is stored in the leaf spring-like vertical locking element 8 while it is moved in the direction of the bottom of the recess 6h and 7h respectively.

A further vertical locking element is shown in FIG. 19. This embodiment can be used for hook elements 6a and 7a respectively as shown in FIGS. 13a to 15b. This involves a vertical locking element 8 having two contact means 8d. The contact means 8d are arranged in a plane perpendicular to the plane of the panels and project laterally from the edge of the hook element 6a and 7a respectively. The contact means 8d have resilient properties. The vertical locking element 8 is provided in recesses 6i and 7j respectively of a hook element 6a and 7a respectively. The side of the contact means 8d, that in the assembled condition is towards the edge of the panel, is no supported in region-wise fashion against a contact surface of the panel edge. Free spaces 8f are provided between the contact means 8d and the contact surface. The free spaces 8f afford a spring travel f by which the contact means 8d can be pushed back out of their projecting position against the contact surface of the panel edge.

The vertical locking element 8 in FIG. 19 is produced in the form of an extruded part and prepared as an article available by the metre. Thus locking element portions have to be cut off the article in order to equip an edge provided with a hook element, with a vertical locking element 8 of suitable length. Desirably the vertical locking element 8 is somewhat shorter than the edge of the respective panel to avoid a portion of the vertical locking element 8 projecting therefrom.

FIGS. 20a and 20b show an embodiment with panels 6 and 7 which very substantially correspond to the panels of the embodiment of FIGS. 6a and 6b. The only difference lies in the vertical locking element 8 and a recess 6i provided in the lower hook element 6a for receiving an insert region 8e of the vertical locking element 8.

The particular vertical locking element 8 is arranged at the same installation location on the lower hook element 6a as the vertical locking element 8 in FIG. 6a. To lock the arrangement to prevent the panels 6 and 7 from moving apart in the plane of the panels, more specifically perpendicularly to the hooked edges, the hook elements 6a and 7a are provided with undercut surfaces 6b and 6c co-operating with undercut surfaces 7b and 7e respectively. The vertical locking element 8 has a projecting resilient contact means 8d which produces a locking action in a vertical direction, namely perpendicularly to the plane of the panels, insofar as it clears the path of joining movement M for the upper hook element 7a, under a counteracting pressure of the upper hook element 7a, and, after the counteracting pressure has gone, automatically moves due to stored spring energy and projects into the path M again and blocks it.

The vertical locking element 8 acquires its resilient properties by virtue of two spring means 8n projecting laterally from the insert region. The spring means 8n are supported against the edge of the lower hook element 6a. They absorb spring energy when the contact means 8d is pushed back into the recess 6i of the lower hook element 6a. Provided between the spring means 8n and the edge of the lower hook element 6a are free spaces 8f which afford space for elastic deformation of the spring means 8n.

The vertical locking element 8 is arranged at a set-back region of the edge of the lower hook element 6a. In addition the vertical locking element 8 has an insert region 8e which approximately corresponds to the insert portion shown in FIG. 6a. The above-mentioned groove-shaped recess 6i is provided in the lower hook element 6a for the insert region 8e. The insert region 8e of the vertical locking element 8 can be received in the groove-shaped recess 6i in such a way that it can be moved backward and forward therein. In that way it contributes to clearing the path of joining movement M and blocking it again, from time to time. On the other hand the insert region 8e can be fixedly connected to the groove-shaped recesses 6i, for example by a press connection by virtue of an oversize and/or by an adhesive introduced into the groove-shaped recess 6i.

FIG. 20b shows dismantling of the panels 6 and 7, of which portions are shown, on the basis of the illustrated hook elements 6a and 7a. The panel 7 is pivoted upwardly along an unlocking curve V1 and V2 respectively, just like the panel 7 in FIG. 6b.

All types of vertical locking elements 8 shown in FIGS. 3a to 20b can be interchanged. This means that a specific vertical locking element 8 shown in one of FIGS. 3a to 20b can be replaced by any other vertical locking element 8 shown in one of FIGS. 3a to 20b. In many cases that means that the configuration of the edge of the respective hook element 6a and 7a respectively has to be adapted to the respective vertical locking element 8 being used, in the region which is in contact with the vertical locking element 8. Under some circumstances a vertical locking element 8 also has to be arranged in laterally reversed relationship so as to ensure the kinematic function. Thus for example the vertical locking element 8 shown in FIG. 9 can be used to replace the vertical locking element 8 shown in FIG. 7a. For that purpose the inclined motion surface 8c of the vertical locking element 8 however must face away from the working surface N of the panel 7 in order in that way to provide a kinematic reversal and to ensure the desired function of automatic locking.

LIST OF REFERENCES

1 panel
2 panel
2a long edge
2b long edge
2c short edge
2d short edge
3 panel
4 panel
5 panel
6 panel
6a hook element
6b undercut surface
6c recess
6d contact surface
6e undercut surface
6f latching recess
6g projecting contact element
6h recess
6i recess
6j latching recess
7 panel
7a hook element
7b undercut surface
7c latching recess
7d contact surface
7e undercut surface
7f recess
7g latching surface
7h recess
7i latching recess
7j recess
8 vertical locking element
8a latching tongue
8b insert portion
8c inclined motion surface
8d contact means
8f free space
8g contact surface
8h holding elements
8i intermediate space
8j inclined surface
8k shoulder
8m support surface
8n spring means
b joining surface
c joining surface
d inclined latching surface
I gap
A groove edge
A1 undercut surface
B spring edge
B1 undercut surface
B floor covering
L length
N working surface
R1 row of panels
R2 row of panels
S dust chamber region
V unlocking curve
V1 unlocking curve
V2 unlocking curve

The invention claimed is:

1. A panel comprising:
a working surface and four edges of which oppositely disposed pairs of edges have corresponding holding profiles so that similar panels are connectable at all four edges,
wherein the holding profiles of a first pair of edges has, at an edge, a groove profile of undercut configuration and, at an opposite edge, a complementary tongue profile, such that the holding profiles of the first pair of edges are connectable by angular movement into interlocking relationship,
wherein the holding profiles of a second pair of edges are complementary hook elements, each of the hook elements has at least one undercut surface, so that a similar adjacent panel is connectable at each of the hook elements substantially by means of a joining movement which occurs in a plane of movement perpendicularly to a plane of the panel, with a proviso that provided at least at one of the hook elements of the second pair of edges is a separate vertical locking element which at least partially projects into a path of joining movement of the hook elements,
wherein during the joining movement of the hook elements of two panels, the vertical locking element is automatically movable out of the path of joining movement to clear same and in hooked condition of the hook elements is movable automatically into the path of joining movement again by a spring action, and
wherein the undercut surface of each of the hook elements are arranged so that when the panels are in hooked condition, the undercut surface of each of the hook elements are arranged on a common unlocking curve and are in contact, and at least one panel is pivotable about an axis extending in a region of hooked edges in a direction in which an unlocking position is reachable, and that working surfaces of the panels in the unlocking position assume an angle relative to each other which is less than 180°.

2. The panel according to claim 1, wherein the vertical locking element projects in a manner of a flexible spring from an edge of the panel, the complementary hook elements have a groove in the form of a latching recess, and at least a part of a projecting flexible spring of the vertical locking element is angularly moved into interlocking relationship into the groove in the complementary hook element.

3. The panel according to claim 2, wherein the hook elements, for the purposes of connection to the complementary hook elements of an adjacent panel are positioned on a substrate, joining of the hook elements of two panels is implemented by the panel which is positioned on the substrate being at rest and by a joining movement being implementable with the adjacent panel, wherein the vertical locking element is provided on the hook element which is at the edge of the panel at rest.

4. The panel according to claim 1, wherein the vertical locking element is spring-elastically movable.

5. The panel according to claim 4, wherein at least for resilient mobility of the vertical locking element, the plane of movement is arranged parallel to the plane of the panel.

6. The panel according to claim 4, wherein, at least for resilient mobility of a vertical locking element, the plane of movement is both perpendicular to the plane of the panel and also perpendicular to an edge provided with the vertical locking element.

7. The panel according to claim 1, wherein there is provided a core material, the core material being HDF or MDF.

8. The panel according to claim 7, wherein the holding profiles of the panels are formed integrally on the core material.

9. The panel according to claim 1, wherein, in connected condition of two panels, at least one dust chamber region is provided within a connection of the holding profiles.

10. The panel according to claim 1, wherein the holding profiles are partially bent in the connected condition of the two panels producing a clamping force, and the clamping force acts in a plane parallel to the plane of the panel.

11. The panel according to claim 1, wherein the holding profiles are partially bent in the connected condition of the two panels producing a clamping force, and the clamping force acts in a plane perpendicular to the plane of the panel.

12. The panel according to claim 1, wherein a clamping force is producible with the vertical locking element in the connected condition of the two panels, and the clamping force acts in a plane arranged parallel to the plane of the panel.

13. The panel according to claim 1, wherein a clamping force is producible with the vertical locking element in the connected condition of the two panels, and the clamping force acts in a plane arranged both perpendicular to the plane of the panel and also perpendicular to an edge provided with the vertical locking element.

14. A floor covering, wherein a plurality of the panels, according to claim 1, are connected together.

15. A floor covering, wherein the panels, according to claim 1, are unlockable with a low level of wear when dismantling the floor covering and the panels, once unlocked, are connectable again to provide a floor covering.

* * * * *

UNITED STATES PATENT AND TRADEMARK OFFICE
CERTIFICATE OF CORRECTION

PATENT NO.      : 8,381,476 B2
APPLICATION NO. : 12/517876
DATED           : February 26, 2013
INVENTOR(S)     : Hans-Juergen Hannig It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 696 days.

Signed and Sealed this
First Day of September, 2015

Michelle K. Lee
*Director of the United States Patent and Trademark Office*